United States Patent
Kato et al.

(10) Patent No.: US 8,435,117 B2
(45) Date of Patent: May 7, 2013

(54) GAME DEVICE, CONTROL METHOD FOR GAME DEVICE, PROGRAM AND INFORMATION MEMORY MEDIUM

(75) Inventors: Katsuhiro Kato, Chiba (JP); Takashi Hayashi, Saitama (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 370 days.

(21) Appl. No.: 12/742,613

(22) PCT Filed: Nov. 18, 2008

(86) PCT No.: PCT/JP2008/070921
§ 371 (c)(1),
(2), (4) Date: May 12, 2010

(87) PCT Pub. No.: WO2009/066653
PCT Pub. Date: May 28, 2009

(65) Prior Publication Data
US 2010/0255911 A1  Oct. 7, 2010

(30) Foreign Application Priority Data

Nov. 21, 2007  (JP) .................................. 2007-301387

(51) Int. Cl.
*G06F 17/00*  (2006.01)
(52) U.S. Cl.
USPC .............................................. 463/34; 463/43
(58) Field of Classification Search ...................... 463/34
See application file for complete search history.

(56) References Cited

U.S. PATENT DOCUMENTS

| 7,297,056 | B2 * | 11/2007 | Takahashi et al. ................. 463/3 |
| 7,377,852 | B2 * | 5/2008 | Nagashima ...................... 463/42 |
| 7,582,010 | B2 * | 9/2009 | Takahashi et al. ................. 463/3 |
| 2001/0011035 | A1 | 8/2001 | Sugimoto |
| 2003/0228896 | A1 * | 12/2003 | Iida et al. .......................... 463/14 |
| 2007/0293317 | A1 * | 12/2007 | Sato et al. ........................ 463/37 |
| 2009/0054143 | A1 | 2/2009 | Suzuki et al. |

FOREIGN PATENT DOCUMENTS

| JP | 2000-157745 A | 6/2000 |
| JP | 3312018 B2 | 5/2002 |
| WO | 2006/103818 A1 | 10/2006 |

* cited by examiner

*Primary Examiner* — David L. Lewis
*Assistant Examiner* — Shauna-Kay Hall
(74) *Attorney, Agent, or Firm* — Sughrue Mion, PLLC

(57) ABSTRACT

An image that is changed according to a change of a numerical value is displayed. A first numerical value changing section changes the numerical value between a first predetermined value and a second predetermined value. A first input value is acquired based on the numerical value obtained at a time corresponding to a time of a first operation. A second numerical value changing section changes, after the first operation, the numerical value between the numerical value obtained at the time corresponding to the time of the first operation and the second predetermined value. A second input value is acquired based on the numerical value obtained at the time corresponding to the time of the first operation and the numerical value obtained at a time corresponding to a time of a second operation. A game is controlled based on the first input value and the second input value.

15 Claims, 15 Drawing Sheets

10 : MOBILE PHONE

FIG.3

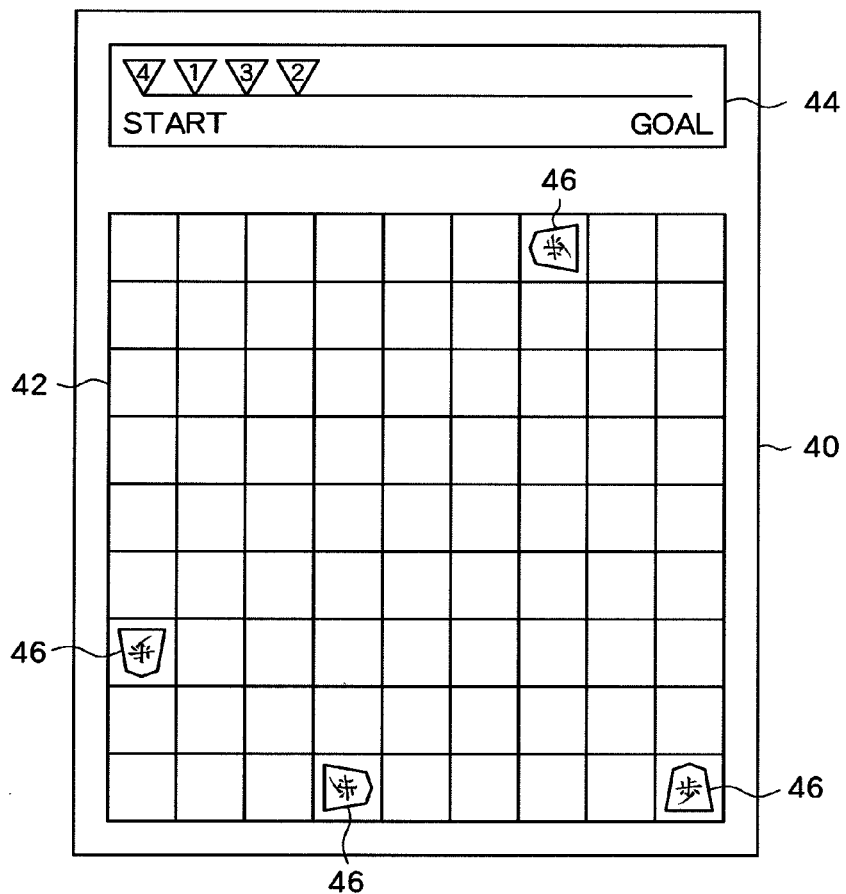

FIG.4

|   | STATE OF "GOLD GENERAL" | MOVEMENT AMOUNT |
|---|---|---|
| 1 | STATE IN WHICH "GOLD GENERAL" LIES PRONE | 0 |
| 2 | STATE IN WHICH "GOLD GENERAL" LIES SUPINE | 1 |
| 3 | STATE IN WHICH "GOLD GENERAL" STANDS HORIZONTALLY | 5 |
| 4 | STATE IN WHICH "GOLD GENERAL" STANDS VERTICALLY | 10 |
| 5 | STATE IN WHICH "GOLD GENERAL" STANDS UPSIDE DOWN | 20 |
| 6 | STATE IN WHICH "GOLD GENERAL" LIES OVER ANOTHER "GOLD GENERAL" OR STATE IN WHICH ANOTHER "GOLD GENERAL" LIES OVER "GOLD GENERAL" | – |
| 7 | STATE IN WHICH "GOLD GENERAL" DOES NOT EXIST ON SHOGI BOARD | – |

FIG.5
(a)
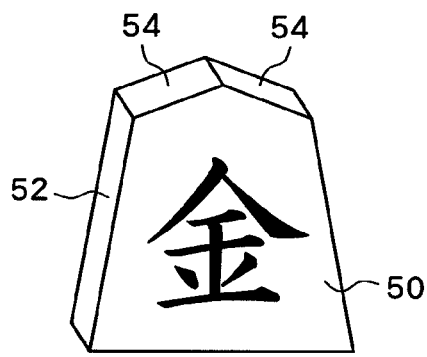
(b)
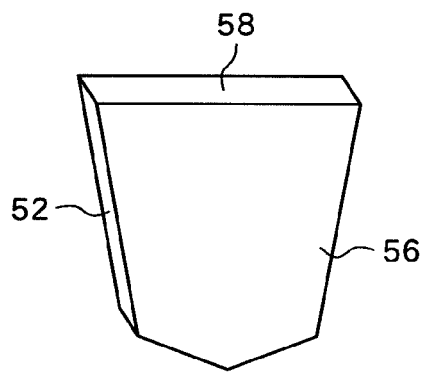
FIG.6
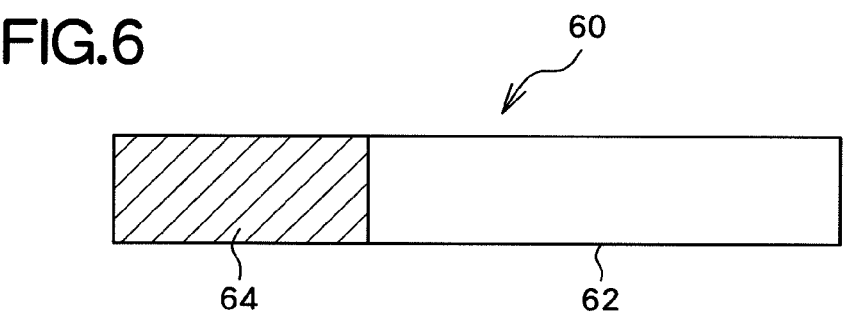
FIG.7
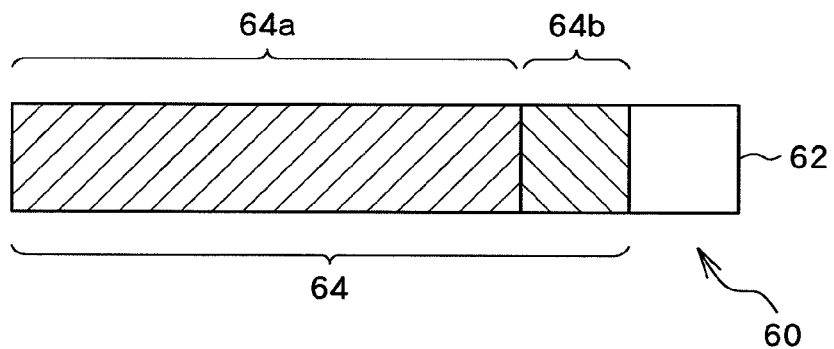

| MOVEMENT AMOUNT | COMBINATION OF STATES OF FOUR "GOLD GENERALS" |
|---|---|
| 0 | (1, 1, 6, 6) |
| | ... |
| | (1, 1, 1, 7) |
| | ... |
| 1 | (1, 1, 1, 2) |
| 2 | (1, 1, 2, 2) |
| 3 | (1, 2, 2, 2) |
| ... | ... |
| 10 | (1, 1, 3, 3) |
| | (1, 1, 1, 4) |
| ... | ... |
| 80 | (5, 5, 5, 5) |

FIG.11

| STRENGTH PARAMETER (p) | SNAP PARAMETER (s) | PROBABILITY DATA |
|---|---|---|
| 0≦p≦10 | 0≦s≦10 | PROBABILITY DATA 1 |
| | 10<s≦20 | PROBABILITY DATA 2 |
| | 20<s≦30 | PROBABILITY DATA 3 |
| | ... | ... |
| | 90<s≦100 | PROBABILITY DATA 10 |
| 10<p≦20 | 0≦s≦10 | PROBABILITY DATA 11 |
| | ... | ... |
| | 80<s<90 | PROBABILITY DATA 19 |
| ... | ... | ... |
| 90<p≦100 | 0≦s<10 | PROBABILITY DATA 55 |

FIG.12

| MOVEMENT AMOUNT | PROBABILITY |
|---|---|
| 0 | P0 |
| 1 | P1 |
| 2 | P2 |
| ... | ... |
| 80 | P80 |

FIG.16

|   | STATE OF "GOLD GENERAL" | PROBABILITY |
|---|---|---|
| 1 | STATE IN WHICH "GOLD GENERAL" LIES PRONE | P1 |
| 2 | STATE IN WHICH "GOLD GENERAL" LIES SUPINE | P2 |
| 3 | STATE IN WHICH "GOLD GENERAL" STANDS HORIZONTALLY | P3 |
| 4 | STATE IN WHICH "GOLD GENERAL" STANDS VERTICALLY | P4 |
| 5 | STATE IN WHICH "GOLD GENERAL" STANDS UPSIDE DOWN | P5 |
| 6 | STATE IN WHICH "GOLD GENERAL" LIES OVER ANOTHER "GOLD GENERAL" OR STATE IN WHICH ANOTHER "GOLD GENERAL" LIES OVER "GOLD GENERAL" | P6 |
| 7 | STATE IN WHICH "GOLD GENERAL" DOES NOT EXIST ON SHOGI BOARD | P7 |

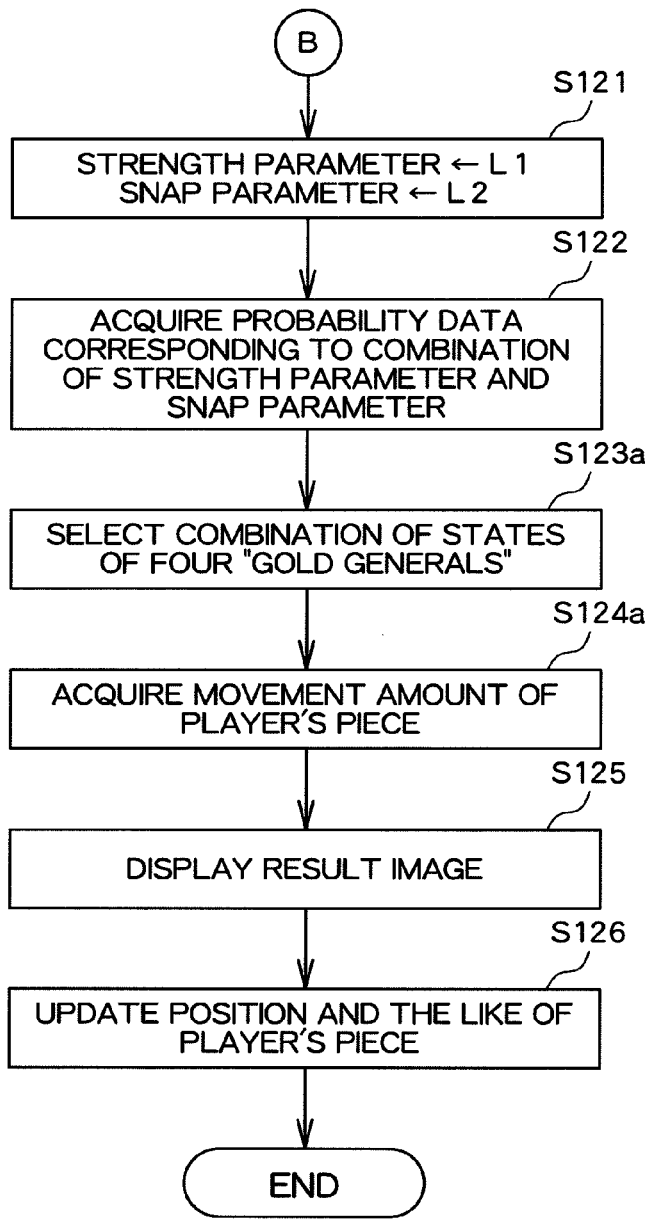

| STRENGTH PARAMETER (p) | RATIO (r) | PROBABILITY DATA |
|---|---|---|
| $0 \leq p \leq 10$ | $0 \leq r \leq 25$ | PROBABILITY DATA 1 |
| | $25 < r \leq 50$ | PROBABILITY DATA 2 |
| | $50 < r \leq 75$ | PROBABILITY DATA 3 |
| | $75 \leq r \leq 100$ | PROBABILITY DATA 4 |
| $10 < p \leq 20$ | $0 \leq r \leq 3$ | PROBABILITY DATA 5 |
| | $3 < r \leq 6$ | PROBABILITY DATA 6 |
| | $6 < r < 9$ | PROBABILITY DATA 7 |
| ... | ... | ... |

FIG.21

| POINT VALUE | COMBINATION OF STATES OF THREE DICE |
|---|---|
| 0 | (7, 7, 7) |
| 0 | (7, 8, 8) |
| 0 | (8, 8, 8) |
| 1 | (1, 7, 7) |
| 1 | (1, 8, 8) |
| 2 | (1, 1, 7) |
| 2 | . . . |
| . . . | . . . |
| 18 | (6, 6, 6) |

FIG.22

| POINT VALUE | PROBABILITY |
|---|---|
| 0 | P0 |
| 1 | P1 |
| 2 | P2 |
| . . . | . . . |
| 18 | P18 |

FIG.23

S201: ACQUIRE PROBABILITY DATA CORRESPONDING TO COMBINATION OF STRENGTH PARAMETER AND SNAP PARAMETER

S202: DECIDE SCORE OF PLAYER

S203: SELECT COMBINATION OF STATES OF THREE DICE

S204: UPDATE GAME SCREEN

FIG.24

| | STATE OF DIE | PROBABILITY |
|---|---|---|
| 1 | STATE IN WHICH PIPS ON DIE COUNT "1" | P1 |
| 2 | STATE IN WHICH PIPS ON DIE COUNT "2" | P2 |
| 3 | STATE IN WHICH PIPS ON DIE COUNT "3" | P3 |
| 4 | STATE IN WHICH PIPS ON DIE COUNT "4" | P4 |
| 5 | STATE IN WHICH PIPS ON DIE COUNT "5" | P5 |
| 6 | STATE IN WHICH PIPS ON DIE COUNT "6" | P6 |
| 7 | STATE IN WHICH DIE HAS FALLEN OFF STAGE | P7 |
| 8 | STATE IN WHICH DIE IS IN PROXIMITY TO ANOTHER DIE | P8 |

FIG.25

| COMBINATION OF STATES OF THREE DICE | PROBABILITY |
|---|---|
| (1, 1, 1) | P1 |
| (1, 1, 2) | P2 |
| (1, 1, 3) | P3 |
| ... | ... |

GAME DEVICE, CONTROL METHOD FOR GAME DEVICE, PROGRAM AND INFORMATION MEMORY MEDIUM

TECHNICAL FIELD

The present invention relates to a game device, a control method for a game device, a program, and an information storage medium.

BACKGROUND ART

There is known a game device for controlling a game based on a game parameter (numerical value) input by a player. On such a game device, a gauge is employed as a user interface for allowing the player to input the game parameter. For example, it is put into practice to display an expanding image that expands with an elapsed time and to acquire the game parameter based on a length of the expanding image at a time point when the player performs a predetermined operation.

Patent Document 1: JP 2000-157745 A

DISCLOSURE OF THE INVENTION

Problems to be Solved by the Invention

Assumed here is a case of realizing a game device for controlling the game based on a plurality of game parameters input by a player. On such a game device, in order to improve entertainment value of the game, for example, such a restriction may be imposed that a total value of the plurality of game parameters must not exceed a predetermined upper limit value. In the case of imposing such a restriction, for example, if the player sets one game parameter to a relatively large value, another game parameter will have to be set to a relatively small value. As a result, it becomes possible to provide player amusement by imposing a retriction that a plurality of game parameters must be input in consideration of a balance among those game parameters.

In order to realize such a game device as described above, it is necessary to realize a user interface for allowing the player to input a plurality of game parameters. As such a user interface that is conceivable, for example, a gauge corresponding to each of the plurality of game parameters may be displayed on a screen. In other words, a plurality of gauges may be displayed on the screen.

However, if the plurality of gauges are simultaneously displayed on the screen, an impression that the screen is complicated may be given to the player. Further, for example, if the screen is displayed in a display section that is relatively small in area, such as a mobile phone or a portable game machine, it is unrealistic to simultaneously display the plurality of gauges on the screen. Further, there is a case where if the gauges that respectively correspond to the plurality of game parameters are independent of one another, the player cannot grasp the balance among the plurality of game parameters at a glance, and the player cannot smoothly input a plurality of game parameters in consideration of the balance among those game parameters.

The present invention has been made in view of the above-mentioned problems, and therefore an object thereof is to provide a game device, a control method for a game device, a program, and an information storage medium that allow a player to smoothly input a plurality of game parameters in consideration of a balance among those game parameters.

Means for Solving the Problems

In order to solve the above-mentioned problems, a game device according to the present invention includes: numerical value storage means for storing a numerical value; image display control means for displaying on a screen an image that is changed according to a change of the numerical value; first numerical value changing means for changing the numerical value between a first predetermined value and a second predetermined value; first input value acquiring means for acquiring, if a first operation is performed, a first input value based on the numerical value obtained at a time corresponding to a time when the first operation is performed; second numerical value changing means for changing, after the first operation is performed, the numerical value between the numerical value obtained at the time corresponding to the time when the first operation is performed and the second predetermined value; second input value acquiring means for acquiring, if a second operation is performed after the first operation has been performed, a second input value based on the numerical value obtained at the time corresponding to the time when the first operation is performed and the numerical value obtained at a time corresponding to a time when the second operation is performed; and game control means for controlling a game based on the first input value and the second input value.

Further, a control method for a game device according to the present invention includes: an image display control step of displaying on a screen an image that is changed according to a change of a numerical value stored in numerical value storage means configured to store the numerical value; a first numerical value changing step of changing the numerical value between a first predetermined value and a second predetermined value; a first input value acquiring step of acquiring, if a first operation is performed, a first input value based on the numerical value obtained at a time corresponding to a time when the first operation is performed; a second numerical value changing step of changing, after the first operation is performed, the numerical value between the numerical value obtained at the time corresponding to the time when the first operation is performed and the second predetermined value; a second input value acquiring step of acquiring, if a second operation is performed after the first operation has been performed, a second input value based on the numerical value obtained at the time corresponding to the time when the first operation is performed and the numerical value obtained at a time corresponding to a time when the second operation is performed; and a game control step of controlling a game based on the first input value and the second input value.

Further, a program according to the present invention causes a computer, such as a mobile phone, a stationary game machine (consumer game machine), a portable game machine, an arcade game machine, a personal digital assistant (PDA), or a personal computer to function as a game device. The program further causes the computer to function as: numerical value storage means for storing a numerical value; image display control means for displaying on a screen an image that is changed according to a change of the numerical value; first numerical value changing means for changing the numerical value between a first predetermined value and a second predetermined value; first input value acquiring means for acquiring, if a first operation is performed, a first input value based on the numerical value obtained at a time corresponding to a time when the first operation is performed; second numerical value changing means for changing, after the first operation is performed, the numerical value between the numerical value obtained at the time corresponding to the time when the first operation is performed and the second predetermined value; second input value acquiring means for acquiring, if a second operation is performed after the first operation has been performed, a second input value based on the numerical value obtained at the time corresponding to the time when the first operation is performed and the numerical value obtained at a time corresponding to a time when the second operation is performed; and game control means for controlling a game based on the first input value and the second input value.

Further, an information storage medium according to the present invention is a computer-readable information storage medium storing the above-mentioned program.

In the present invention, the image that is changed according to the change of the numerical value stored in the storage means is displayed on the screen. The numerical value is changed between the first predetermined value and the second predetermined value. If the first operation is performed, the first input value is acquired based on the numerical value obtained at the time corresponding to the time when the first operation is performed. Further, after the first operation is performed, the numerical value is changed between the numerical value obtained at the time corresponding to the time when the first operation is performed and the second predetermined value. Then, if the second operation is performed after the first operation has been performed, the second input value is acquired based on the numerical value obtained at the time corresponding to the time when the first operation is performed and the numerical value obtained at the time corresponding to the time when the second operation is performed. The game is controlled based on the first input value and the second input value. According to the present invention, it becomes possible for the player to smoothly input a plurality of game parameters in consideration of a balance among those game parameters.

Further, according to an aspect of the present invention, the first input value acquiring means may acquire the first input value based on a difference between the first predetermined value and the numerical value obtained at the time corresponding to the time when the first operation is performed. The second input value acquiring means may acquire the second input value based on a difference between the numerical value obtained at the time corresponding to the time when the first operation is performed and the numerical value obtained at the time corresponding to the time when the second operation is performed.

Further, according to an aspect of the present invention, the game control means may control the game based on a ratio between the first input value and the second input value.

Further, according to an aspect of the present invention, the game may be a game that progresses based on a combination of respective states of a plurality of objects, which is decided according to an operation of a player. The game control means may include: means for storing one or more combinations of the respective states of the plurality of objects in association with each of a plurality of game progress control information items; game progress control information selecting means for selecting any one of the plurality of game progress control information items based on the first input value and the second input value; combination selecting means for selecting any one of the one or more combinations stored in association with the game progress control information item selected by the game progress control information selecting means; means for displaying on the screen the combination selected by the combination selecting means; and means for controlling progress of the game based on the game progress control information item selected by the game progress control information selecting means.

Further, according to an aspect of the present invention, the game may be a game that progresses based on a combination of respective states of a plurality of objects, which is decided according to an operation of a player. The game control means may include: means for storing data obtained by associating the combination of the respective states of the plurality of objects with probability information, in association with conditions related to the first input value and the second input value; means for storing a game progress control information item in association with the combination of the respective states of the plurality of objects; combination selecting means for reading the data stored in association with the condition satisfied by the first input value and the second input value, and for selecting the combination of the respective states of the plurality of objects with a probability based on the probability information associated with the combination of the respective states of the plurality of objects in the data; means for displaying on the screen the combination of the respective states of the plurality of objects selected by the combination selecting means; and means for controlling progress of the game based on the game progress control information item stored in association with the combination of the respective states of the plurality of objects selected by the combination selecting means.

Further, according to an aspect of the present invention, the game may be a game that progresses based on a combination of respective states of a plurality of objects, which is decided according to an operation of a player. The game control means may include: means for storing data obtained by associating each of a plurality of states into which the object can be brought with probability information, in association with conditions related to the first input value and the second input value; means for storing a game progress control information item in association with the combination of the respective states of the plurality of objects; state selecting means for reading the data stored in association with the condition satisfied by the first input value and the second input value, and for selecting the respective states of the plurality of objects from the plurality of states with a probability based on the probability information associated with the each of the plurality of states in the data; means for displaying on the screen the combination of the respective states of the plurality of objects selected by the state selecting means; and means for controlling progress of the game based on the game progress control information item stored in association with the combination of the respective states of the plurality of objects selected by the state selecting means.

BRIEF DESCRIPTION OF THE DRAWINGS

FIG. 3 A diagram illustrating an example of a game screen.

FIG. 4 A diagram used for description of a relationship between a state of a "gold general" and a movement amount of a piece.

FIG. 5 Diagrams useful for description of the state of the "gold general".

FIG. 6 A diagram used for description of a gauge.

FIG. 7 A diagram used for description of the gauge.

FIG. 11 A diagram illustrating an example of a probability data table.

FIG. 12 A diagram illustrating an example of probability data.

FIG. 16 A diagram illustrating an example of the probability data.

FIG. 17 A flowchart illustrating processing executed by the mobile phone.

FIG. 18 A diagram illustrating an example of the probability data.

FIG. 21 A diagram illustrating an example of a point table.

FIG. 22 A diagram illustrating an example of the probability data.

FIG. 23 A flowchart illustrating processing executed by the mobile phone.

FIG. 24 A diagram illustrating an example of the probability data.

FIG. 25 A diagram illustrating an example of the probability data.

BEST MODE FOR CARRYING OUT THE INVENTION

Hereinafter, detailed description is given of examples of embodiments of the present invention with reference to the drawings. Here, description is given of an example in which a game device according to the present invention is implemented by using a mobile phone. Note that the game device according to the present invention can also be implemented by using a stationary game machine (consumer game machine), a portable game machine, an arcade game machine, a personal digital assistant (PDA), a personal computer, or the like.

First Embodiment

Figure 1:
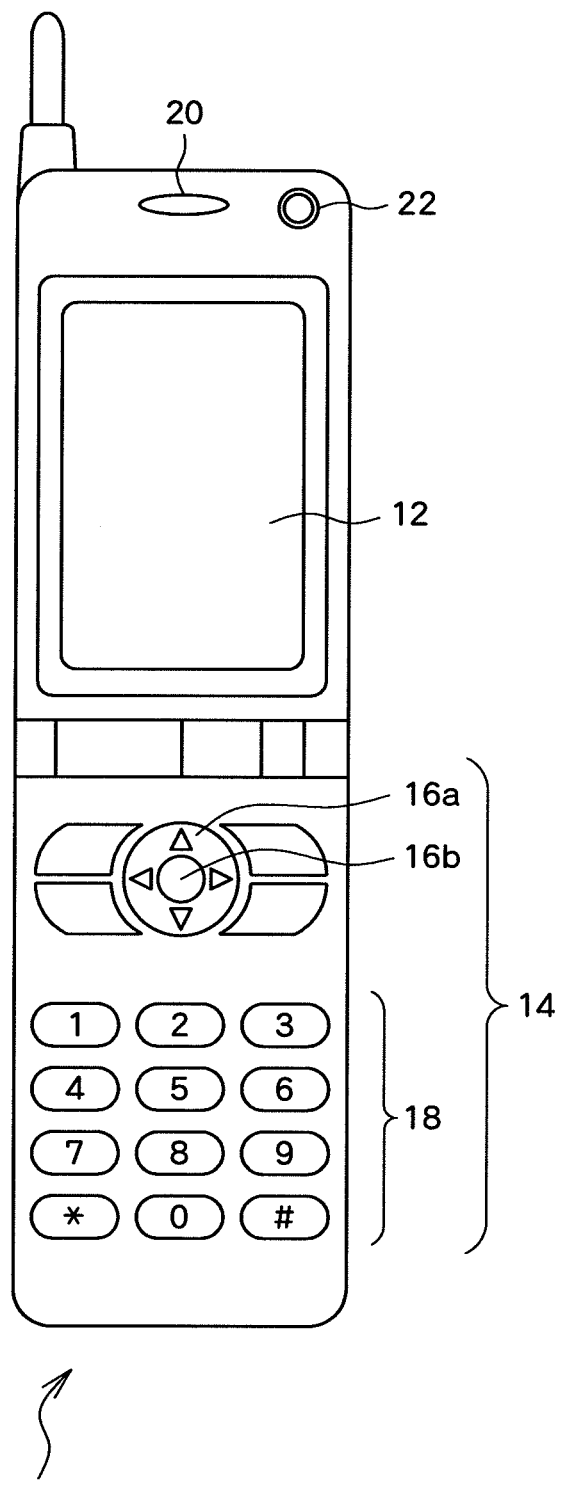
FIG. 1 A diagram illustrating external appearance of a mobile phone according to an embodiment of the present invention.
Figure 2:
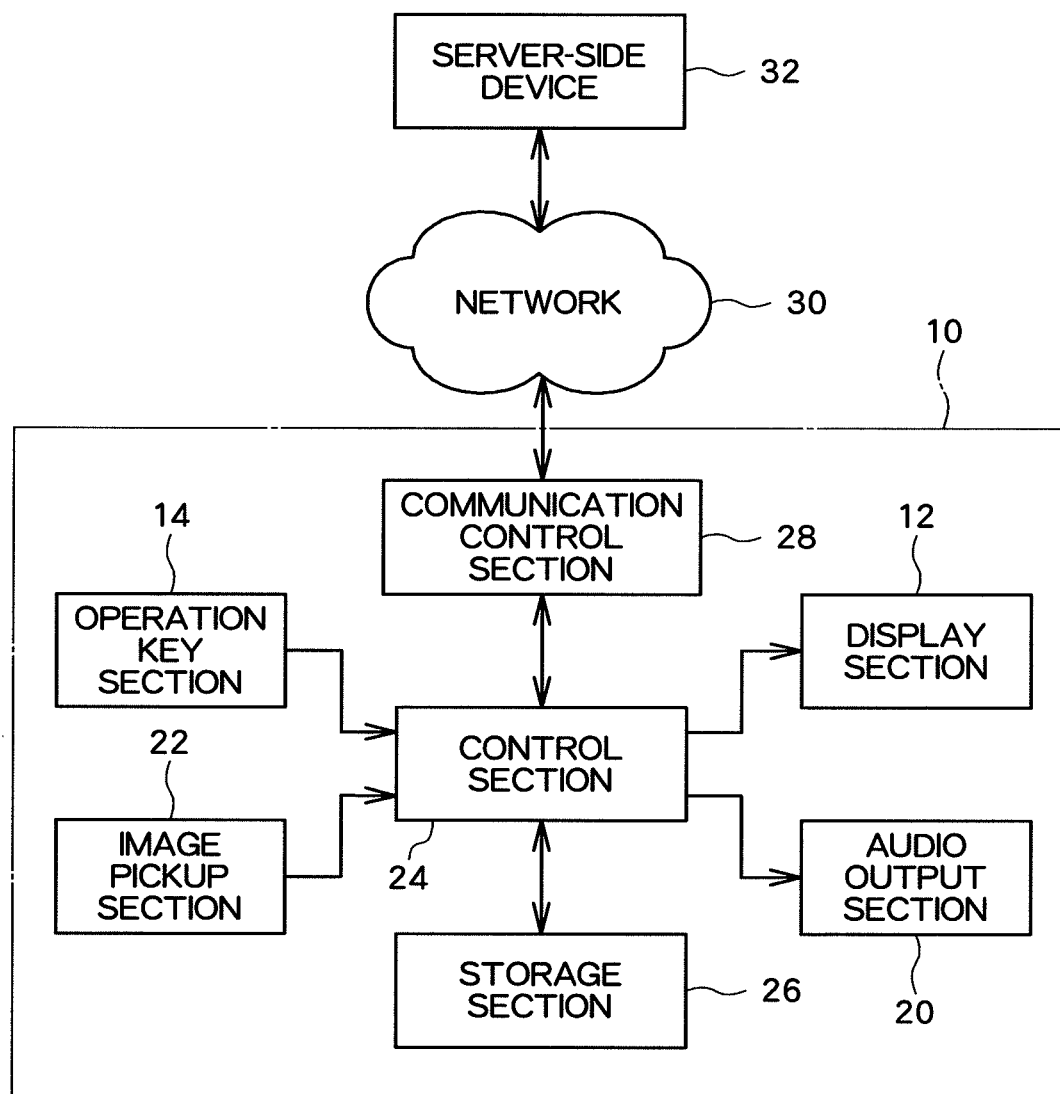
FIG. 2 A diagram illustrating a hardware configuration of the mobile phone according to the embodiment of the present invention.

FIG. 1 illustrates an example of external appearance of a mobile phone 10 (game device) according to an embodiment of the present invention. FIG. 2 illustrates a hardware configuration of the mobile phone 10. As illustrated in FIG. 1 and FIG. 2, the mobile phone 10 includes a display section 12, an operation key section 14, an audio output section 20, an image pickup section 22, a control section 24, a storage section 26, and a communication control section 28.

The control section 24 controls each of the sections of the mobile phone 10 according to a program stored in the storage section 26. The control section 24 performs ordinary processing for a mobile phone (processing for an outgoing call and an incoming call and processing regarding a conversation), but hereinbelow, the description is mainly directed to processing related to the present invention. Specific contents of the processing executed by the control section 24 are described later.

The storage section 26 includes a main memory and a nonvolatile memory. The nonvolatile memory retains a program executed by the control section 24. The program is, for example, stored in the nonvolatile memory after being downloaded from a server-side device 32 via a network 30. Alternatively, the program is, for example, stored in the nonvolatile memory after being copied from a computer-readable information storage medium such as a memory card. A program read from the nonvolatile memory and various kinds of data necessary for the processing performed by the control section 24 are written to the main memory as necessary.

The communication control section 28 makes an outgoing call to a counterpart via a mobile phone line network according to an instruction for an outgoing call which is input from the control section 24. Meanwhile, if a reception request arrives via the mobile phone line network, the communication control section 28 informs the control section 24 that the reception request has arrived. Further, if there is an instruction for an incoming call from the control section 24, the communication control section 28 performs the processing for an incoming call in response to the reception request. Upon reception of an instruction to transmit data from the control section 24 to the server-side device 32 (see FIG. 2), the communication control section 28 transmits the data regarding the instruction via the network 30 (see FIG. 2). Further, the communication control section 28 receives the data that has arrived via the network 30 and outputs the data to the control section 24.

The display section 12 includes, for example, a liquid crystal panel. The display section 12 displays each of various kinds of screens according to an instruction input from the control section 24. The audio output section 20 outputs each of various kinds of audio (for example, ring tone, game music, and sound effects) according to an instruction input from the control section 24.

The operation key section 14 includes a direction indicating key 16a used for a direction indicating operation, an enter key 16b, and a key group 18 including ten numeric keys (ten-key keypad) corresponding to the respective numerals "0" to "9". The image pickup section 22 includes, for example, a known digital camera, and supplies the control section 24 with a taken image in black-and-white, gray scale, or color every predetermined time (for example, $\frac{1}{60}^{th}$ of a second).

On the mobile phone 10 according to a first embodiment, for example, a game of "mawari shogi", which is performed between one player (human) and three virtual players (computer), is executed. This game is implemented by the control section 24 executing a game program stored in the storage section 26.

FIG. 3 illustrates an example of a game screen. As illustrated in FIG. 3, a shogi board 42 and a progress image 44 are displayed in a game screen 40. In addition, pieces 46 of the player and the virtual players are displayed on the shogi board 42.

Here, description is given of the "mawari shogi" game. "mawari shogi" is a game that resembles sugoroku. Start positions of the player and the virtual players are each set at one of four corners of the shogi board 42 so as not to overlap one another. In "mawari shogi", four pieces (objects) of "gold general" are used in place of dice. Note that hereinafter, the piece of "gold general" is referred to simply as "gold general". In the same manner, the other shogi pieces are referred to simply by type names of the pieces. In their own turns, the player and the virtual players each roll four "gold generals". Then, the player and the virtual players can move their own pieces 46 by the number decided according to states of the four "gold generals". The piece 46 moves along squares around the edges of the shogi board counterclockwise.

FIG. 4 is a diagram used for description of a relationship between the state of the "gold general" and a movement amount of the piece 46 (the number of squares that the piece 46 can move). FIG. 5, which illustrate the "gold general", are diagrams used for description of the state of the "gold general". As illustrated in FIG. 4, the state of the "gold general" is classified into seven states (a first state to a seventh state). The first state is a state in which the "gold general" lies prone. In other words, the first state is a state in which a front surface 50 (surface on which characters are written) of the "gold general" is in contact with the shogi board with a back surface 56 of the "gold general" facing up. The second state is a state in which the "gold general" lies supine. In other words, the second state is a state in which the back surface 56 of the "gold general" is in contact with the shogi board with the front surface 50 of the "gold general" facing up. The third state is a state in which the "gold general" stands horizontally. In other words, the third state is a state in which the "gold general" stands with a side surface 52 of the "gold general" in contact with the shogi board. The fourth state is a state in which the "gold general" stands vertically. In other words, the fourth state is a state in which the "gold general" stands with a bottom surface 58 of the "gold general" in contact with the shogi board. The fifth state is a state in which the "gold general" stands upside down. In other words, the fifth state is a state in which the "gold general" stands with a top surface 54 of the "gold general" in contact with the shogi board. The sixth state is a state in which the "gold general" lies over another "gold general" or a state in which another "gold general" lies over the "gold general". The seventh state is a state in which the "gold general" has fallen off the shogi board and is not on the shogi board. Note that the third to fifth states are less stable than the first and second states, and because the state of the "gold general" rarely becomes the third to fifth states, the movement amounts corresponding to the third to fifth states are set to be larger than the movement amounts corresponding to the first and second states. Also because the fifth state is a particularly unstable state among the third to fifth states, the movement amount corresponding to the fifth state is set to be larger than the movement amounts corresponding to the third and fourth states. Also because the fourth state is less stable than the third state, the movement amount corresponding to the fourth state is set to be larger than the movement amount corresponding to the third state.

In principle, the movement amount of the piece 46 is a sum of the movement amounts corresponding to the respective states of the four "gold generals". For example, it is assumed that the states of two "gold generals" are the second state and the states of the other two "gold generals" are the third state. The movement amount corresponding to the second state is "1", and the movement amount corresponding to the third state is "5", which makes the movement amount of the piece 46 count up to "12" (=1+1+5+5). Note that in a case where the states of the four "gold generals" are all the first state, the sum of the movement amounts corresponding to the respective states of the four "gold generals" should become "0", but the movement amount of the piece 46 becomes "20" as an exception. Further, in a case where the state of any one of the "gold generals" is the sixth state or the seventh state, the movement amount of the piece 46 becomes "0" regardless of the states of the other "gold generals".

The shogi piece used as the piece 46 is changed every time the piece 46 moves a lap around the shogi board. The piece 46 is changed in the order of "pawn", "lance", "knight", "silver general", "bishop", "rook", and "king". When the piece 46 returns to the start position after moving a lap around the shogi board in a state of being a "king", the player or the virtual player related to the piece 46 reaches a goal. In the "mawari shogi" game, the player or the virtual player who reaches the goal first becomes the winner.

Note that as illustrated in FIG. 3, the progress image 44 for indicating how far the player and the virtual players have progressed is displayed on the game screen 40. According to the progress image 44, the player can learn how far the player and the virtual players have progressed.

Here, description is given of an operation performed to roll the four "gold generals". To roll the four "gold generals", the player inputs a strength parameter and a snap parameter.

The strength parameter is a parameter indicating a strength with which the "gold generals" are to be rolled. The strength parameter takes a value ranging from "0" to "100". As the strength parameter becomes larger, the "gold generals" are to be rolled with larger strength. Note that as the "gold generals" are to be rolled with larger strength, the possibility that the "gold general" may fall off the shogi board 42 becomes higher. In other words, there is a higher possibility that the state of the "gold general" may become the seventh state. On the other hand, as the "gold generals" are to be rolled with smaller strength, the possibility that the "gold generals" may overlap one another becomes higher. In other words, there is a higher possibility that the state of the "gold general" may become the sixth state.

The snap parameter is a parameter indicating how much snap (strength in the wrist) is to be applied when the "gold generals" are rolled. The snap parameter takes a value ranging from "0" to "100". As the snap parameter becomes larger, the snap is to be applied more greatly when the "gold generals" are rolled. Note that as the snap is to be applied more greatly when the "gold generals" are rolled, the possibility that the "gold general" may stand becomes higher, and also the possibility that the "gold generals" may overlap one another becomes higher. In other words, there is a higher possibility that the state of the "gold general" may become the third to fifth states, and there is also a higher possibility that the state of the "gold general" may become the sixth state.

Note that such a restriction is imposed on this game that a total value of the strength parameter and the snap parameter must be equal to or smaller than "100". Therefore, for example, if the player sets the strength parameter to a relatively large value, the player will have to set the snap parameter to a relatively small value. This makes it necessary for the player to input the strength parameter and the snap parameter in consideration of a balance between the strength parameter and the snap parameter. On the mobile phone 10, such a user interface is implemented as to allow the player to input the strength parameter and the snap parameter in consideration of the balance between those parameters. Hereinafter, description is given of the user interface.

At a time when the player is ready to roll the four "gold generals", a single gauge for inputting the strength parameter and the snap parameter is displayed in the center of the game screen 40. FIG. 6 and FIG. 7 are diagrams used for description of an example of the gauge.

As illustrated in FIG. 6, a gauge 60 includes a frame image having a rectangular shape and an expandable image (an expansion-and-contraction image) 64 left-aligned inside the frame image 62. The expandable image 64 expands and contracts with elapsed time. When the gauge 60 is initially displayed on the game screen 40, the expandable image 64 has a length of zero. In other words, a right edge of the expandable image 64 and a left edge of the frame image 62 are overlapping each other. When the player performs a start instructing operation (in this embodiment, depression of the enter key 16b), the expandable image 64 expands in a rightward direction at a constant velocity. The expandable image 64 expands up to the right edge of the frame image 62 at maximum. Note that hereinbelow, the description is given by assuming that the maximum length of the expandable image 64 (length in a case where the expandable image 64 expands up to the right edge of the frame image 62) is "100".

Once the expandable image 64 starts to expand, the player can input the strength parameter by performing a strength parameter inputting operation (in this embodiment, depression of the enter key 16b). The value of the strength parameter is set as the length of the expandable image 64 at the time of the strength parameter inputting operation. For example, if the length of the expandable image 64 at the time of the strength parameter inputting operation is "70", the strength parameter is set to have a value of "70".

Even after the strength parameter inputting operation has been performed, the expandable image 64 keeps expanding. FIG. 7 illustrates the gauge 60 in this case. In this case, of the expandable image 64, a portion 64a that expands until the time of the strength parameter inputting operation and a portion 64b corresponding to a change of the expandable image after the strength parameter inputting operation are distinguishably displayed. Further, if the expandable image 64 has expanded up to the right edge of the frame image 62, the expandable image 64 starts to contract. In this case, the length of the expandable image 64 is changed between the length at the time of the strength parameter inputting operation and the maximum length.

After the strength parameter inputting operation has been performed, the player can input the snap parameter by performing a snap parameter inputting operation (in this embodiment, depression of the enter key 16b) until a time when the length of the expandable image 64 returns to the length at the time of the strength parameter inputting operation. The value of the snap parameter is set as a difference between the length of the expandable image 64 at a time of the snap parameter inputting operation and the length of the expandable image 64 at the time of the strength parameter inputting operation. For example, if the length of the expandable image 64 at the time of a strength parameter inputting operation is "70", and if the length of the expandable image 64 at the time of a snap parameter inputting operation is "90", the snap parameter is set to have a value of "20". Note that here, as the difference in the length of the expandable image 64 between the time of the snap parameter inputting operation and the time of the strength parameter inputting operation becomes larger, the value of the snap parameter is set larger. However, as the difference in the length of the expandable image 64 between the time of the snap parameter inputting operation and the time of the strength parameter inputting operation becomes smaller, the value of the snap parameter may be set larger.

Figure 8:
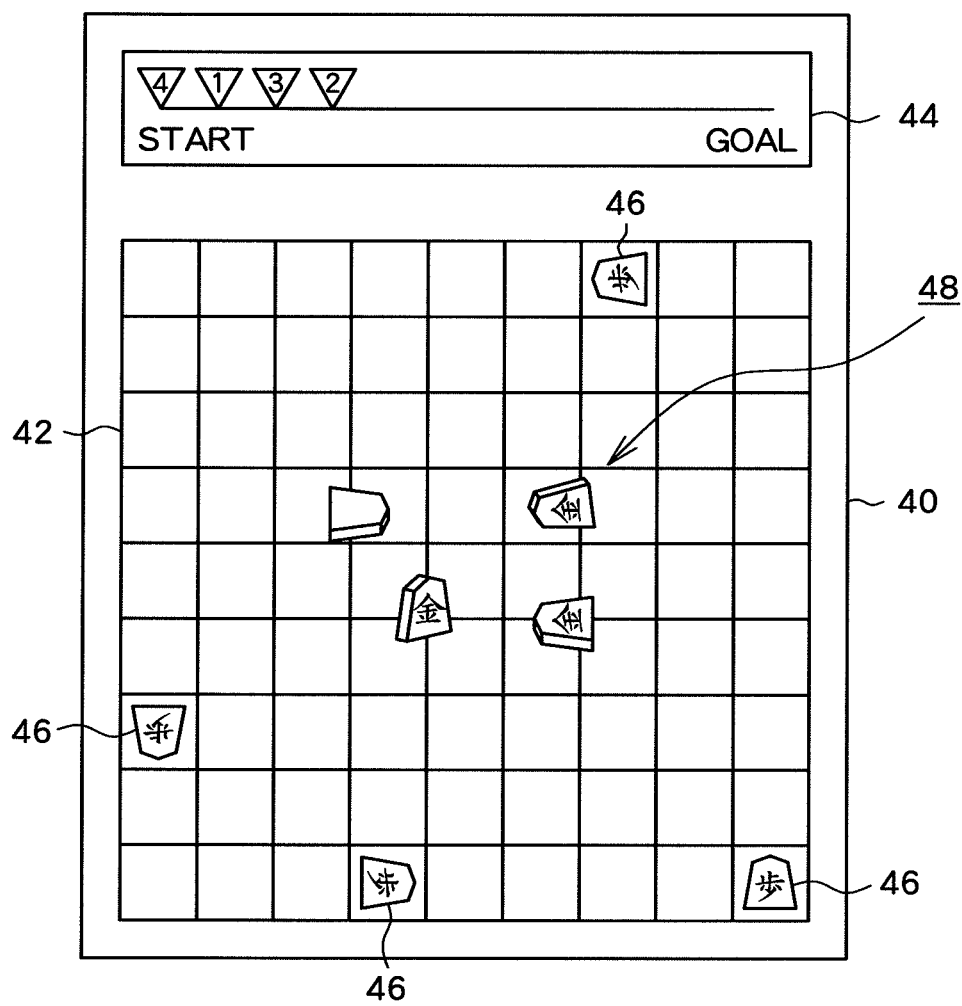
FIG. 8 A diagram illustrating an example of the game screen.

If the snap parameter inputting operation has been performed, the respective states of the four "gold generals" and the movement amount of the player's piece 46 are decided based on the strength parameter and the snap parameter. After that, the game screen 40 is updated based on the decided contents. Specifically, first, the respective states of the four "gold generals" are displayed on the game screen 40. FIG. 8 illustrates an example of the game screen 40 in this case. A result image 48 for indicating the respective states of the four "gold generals" is displayed on the game screen 40 illustrated in FIG. 8. After that, the player's piece 46 moving by the movement amount (number of squares) corresponding to a combination of the states of the four "gold generals" is displayed on the game screen 40.

As described above, on the mobile phone 10, the inputting of the two parameters, in other words, the strength parameter and the snap parameter, is performed by using the single gauge 60 (expandable image 64). The value of the strength parameter is acquired based on the length of an expansion portion (portion 64a) that expands until the time of the strength parameter inputting operation, and the value of the snap parameter is acquired based on the length of a difference portion (portion 64b) between the time of the strength parameter inputting operation and the time of the snap parameter inputting operation. As a result, the player is allowed to smoothly input the strength parameter and the snap parameter in consideration of the balance between those parameters. In addition, on the mobile phone 10, there is no need to individually display the gauge for inputting the strength parameter and the gauge for inputting the snap parameter. The mobile phone 10 is adapted to avoid giving the player such an impression that the screen is complicated. Hereinafter, description is given of a configuration for implementing such a user interface.

Figures 9, 10:
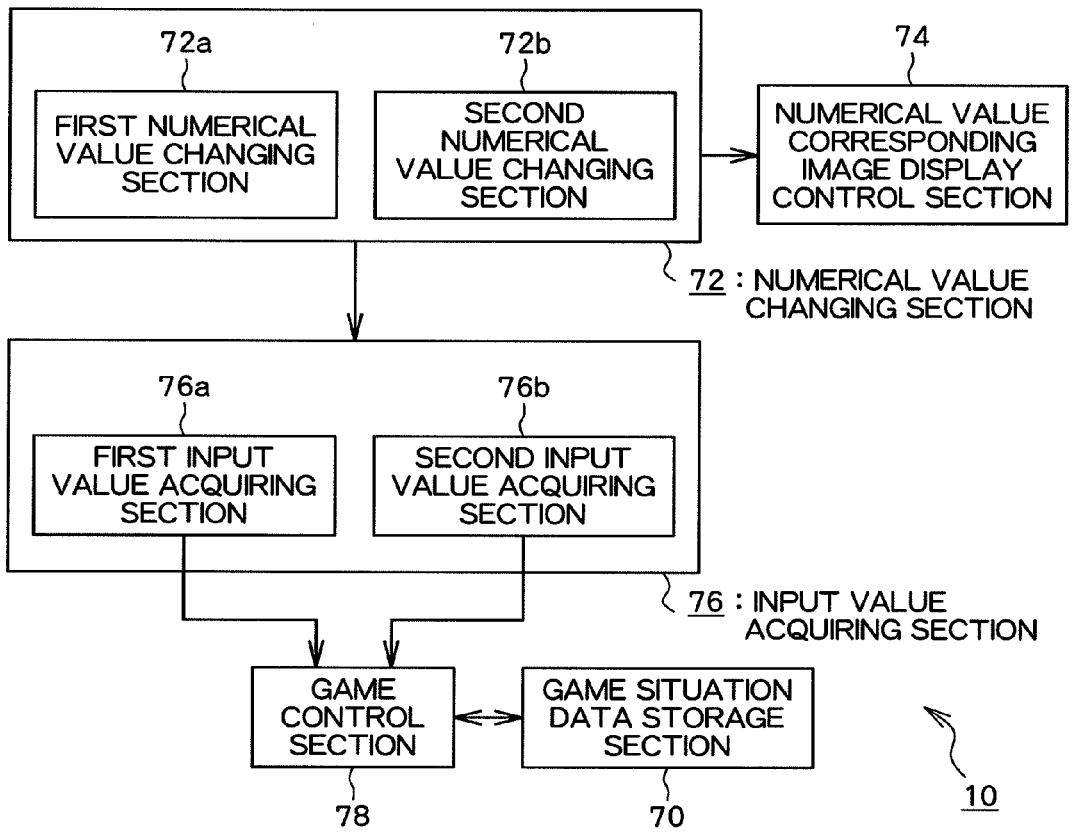
FIG. 9 A functional block diagram of the mobile phone according to the embodiment of the present invention.
FIG. 10 A diagram illustrating an example of a movement amount table.

First, description is given of functional blocks implemented by the mobile phone 10. FIG. 9 mainly illustrates functional blocks related to the present invention among the functional blocks implemented by the mobile phone 10. As illustrated in FIG. 9, the mobile phone 10 includes a game situation data storage section 70, a numerical value changing section 72, a numerical value corresponding image display control section 74, an input value acquiring section 76, and a game control section 78.

The game situation data storage section 70 is implemented by the storage section 26. The game situation data storage section 70 stores game situation data that indicates a current situation of the game. The game situation data includes, for example, current positions of the pieces 46 of the player and the virtual players, types (such as "pawn" and "lance") of the current pieces 46 of the player and the virtual players, and current lap numbers of the player and the virtual players.

The numerical value changing section 72 is implemented mainly by the control section 24. The numerical value changing section 72 changes a numerical value stored in a main memory (numerical value storage means) according to a predetermined rule. The numerical value changing section 72 includes a first numerical value changing section 72a and a second numerical value changing section 72b. The first numerical value changing section 72a changes the numerical value stored in the main memory between a first predetermined value and a second predetermined value. After the $(n-1)^{th}$ (n: an integer that satisfies $n \geq 2$) operation is performed, the second numerical value changing section 72b changes the numerical value stored in the main memory between a numerical value obtained at a time corresponding to a time when the $(n-1)^{th}$ operation is performed and the second predetermined value. For example, after the first operation is performed, the second numerical value changing section 72b changes the numerical value stored in the main memory between a numerical value obtained at the time corresponding to the time when the first operation is performed and the second predetermined value. Further, for example, after the second operation is performed, the second numerical value changing section 72b changes the numerical value stored in the main memory between a numerical value obtained at the time corresponding to the time when the second operation is performed and the second predetermined value. Note that the time corresponding to the time when the operation is performed may be a time when the operation is performed per se, or may be a predetermined time before or after the time when the operation is performed.

In the case of this embodiment, the first numerical value changing section 72a gradually changes the numerical value from "0" (first predetermined value) to "100" (second predetermined value). Then, if the strength parameter inputting operation is performed, the second numerical value changing section 72b changes the numerical value between the numerical value obtained at the time of the strength parameter inputting operation and "100" (second predetermined value).

The numerical value corresponding image display control section 74 is implemented mainly by the control section 24. The numerical value corresponding image display control section 74 displays on the screen an image that is changed according to a change of the numerical value (numerical value changed by the numerical value changing section 72) stored in the main memory.

In the case of this embodiment, the numerical value corresponding image display control section 74 displays the gauge 60 on the game screen 40. In other words, the numerical value corresponding image display control section 74 displays on the game screen 40 the expandable image 64 that is changed in length (area) according to the change of the numerical value (numerical value changed by the numerical value changing section 72) stored in the main memory.

Note that within the frame image 62 of the gauge 60, a cursor image that is changed in position according to the change of the numerical value (numerical value changed by the numerical value changing section 72) stored in the main memory may be displayed in place of the expandable image 64. Further, the frame image 62 of the gauge 60 may be, for example, an image representing a circular frame. In this case, in place of the expandable image 64, a fan-shaped image may be displayed within the frame image 62. Then, a central angle (area) of the fan-shaped image may be changed according to the change of the numerical value (numerical value changed by the numerical value changing section 72) stored in the main memory.

The input value acquiring section 76 is implemented mainly by the control section 24. The input value acquiring section 76 includes a first input value acquiring section 76a and a second input value acquiring section 76b. If the first operation is performed, the first input value acquiring section 76a acquires a first input value based on the numerical value obtained at the time corresponding to the time when the first operation is performed. Further, if the $n^{th}$ operation is performed after the $(n-1)^{th}$ (n: an integer that satisfies $n \geq 2$) operation is performed, the second input value acquiring section 76b acquires an $n^{th}$ input value based on the numerical value obtained at the time corresponding to the time when the $(n-1)^{th}$ operation is performed and the numerical value obtained at the time corresponding to the time when the $n^{th}$ operation is performed. For example, if the second operation is performed after the first operation is performed, the second input value acquiring section 76b acquires a second input value based on the numerical value obtained at the time corresponding to the time when the first operation is performed and the numerical value obtained at the time corresponding to the time when the second operation is performed. Further, for example, if the third operation is performed after the second operation is performed, the second input value acquiring section 76b acquires a third input value based on the numerical value obtained at the time corresponding to the time when the second operation is performed and the numerical value obtained at the time corresponding to the time when the third operation is performed.

In the case of this embodiment, if the strength parameter inputting operation (first operation) is performed, the first input value acquiring section 76a acquires the strength parameter (first input value) based on the difference between the numerical value obtained at the time of the start instructing operation (in other words, "0" (first predetermined value)) and the numerical value obtained at the time of the strength parameter inputting operation. Further, if the snap parameter inputting operation (second operation) is performed, the second input value acquiring section 76b acquires the snap parameter (second input value) based on the difference between the numerical value obtained at the time of the strength parameter inputting operation and the numerical value obtained at the time of the snap parameter inputting operation.

Note that the first input value acquiring section 76a may calculate the value of the strength parameter by substituting the numerical value obtained at the time of the strength parameter inputting operation into a predetermined arithmetic expression. Alternatively, the first input value acquiring section 76a may store a table obtained by associating the numerical value obtained at the time of the strength parameter inputting operation with the strength parameter, the first input value acquiring section 76a may acquire, based on the table, the value of the strength parameter corresponding to the numerical value obtained at the time of the strength parameter inputting operation. Also in the same manner, the second input value acquiring section 76b may calculate the value of the snap parameter by substituting a difference value between the numerical value obtained at the time of the strength parameter inputting operation and the numerical value obtained at the time of the snap parameter inputting operation into a predetermined arithmetic expression. Alternatively, the second input value acquiring section 76b may store a table obtained by associating the difference value between the numerical value obtained at the time of the strength parameter inputting operation and the numerical value obtained at the time of the snap parameter inputting operation with the snap parameter, the second input value acquiring section 76b may acquire, based on the table, the value of the snap parameter corresponding to the difference between the numerical value obtained at the time of the strength parameter inputting operation and the numerical value obtained at the time of the snap parameter inputting operation.

The game control section 78 is implemented mainly by the control section 24 and the storage section 26. The game control section 78 controls the game based on the first to $n^{th}$ input values acquired by the input value acquiring section 76. For example, the game control section 78 updates the game situation data based on the first to $n^{th}$ input values acquired by the input value acquiring section 76.

In the case of this embodiment, the game control section 78 stores a movement amount table. FIG. 10 illustrates an example of the movement amount table. The movement amount table illustrated in FIG. 10 is a table obtained by associating the movement amount (game progress control information) of the piece 46 with the combination of the states of the four "gold generals". In FIG. 10, for example, "(1,1,6, 6)" indicates that the states of two "gold generals" are the first state and that the states of the remaining two "gold generals" are the sixth state.

The game control section 78 (game progress control information selecting means) selects any one of the movement amounts stored in the movement amount table as the movement amount of the player's piece 46 based on the strength parameter and the snap parameter. As data for selecting the movement amount of the player's piece 46, the game control section 78 stores such data as described below.

The game control section 78 stores a probability data table. FIG. 11 illustrates an example of the probability data table. The probability data table is data obtained by associating probability data with conditions related to the strength parameter and the snap parameter. The probability data table illustrated in FIG. 11 is data obtained by associating the probability data with a combination of the conditions related to the strength parameter and the conditions related to the snap parameter. The probability data table illustrated in FIG. 11 may also be regarded as data obtained by associating the probability data with conditions related to a balance between the strength parameter and the snap parameter. FIG. 12 is a diagram illustrating an example of the probability data. As illustrated in FIG. 12, the probability data is data obtained by associating the movement amount of the piece 46 with probability information.

As described above, if the strength with which the "gold generals" are to be rolled is large, the probability that the "gold general" may fall off the shogi board 42 is higher. If the "gold general" falls off the shogi board 42, the movement amount of the piece 46 becomes "0". Therefore, the probability data table and the probability data are set so that the probability (P0) that the movement amount of the piece 46 may become "0" becomes high if the value of the strength parameter is large. For example, in the probability data associated with the range "90<p≦100" of the strength parameter (p), the probability (P0) associated with the movement amount "0" is set to be high.

Further, as described above, if the strength with which the "gold generals" are to be rolled is small, the probability that the "gold generals" may overlap one another is higher. If the "gold generals" overlap one another, the movement amount of the piece 46 becomes "0". Therefore, the probability data table and the probability data are set so that the probability (P0) that the movement amount of the piece 46 may become "0" also becomes high if the value of the strength parameter is small. For example, in the probability data associated with the range "0≦p≦10" of the strength parameter (p), the probability (P0) associated with the movement amount "0" is set to be high.

Further, as described above, if an extent to which the snap is to be applied when the "gold generals" are rolled is large, the probability that the "gold general" may stand becomes high, and also the probability that the "gold generals" may overlap one another becomes high. If the "gold general" stands (third state to fifth state), the movement amount of the piece 46 becomes large. On the other hand, if the "gold generals" overlap one another, the movement amount of the piece 46 becomes "0". Therefore, the probability data table and the probability data are set so that the probability (for example, P80) that the movement amount of the piece 46 may become large and the probability (for example, P0) that the movement amount of the piece 46 may become "0" become relatively high if the value of the snap parameter is large. For example, in the probability data associated with the range "90<s≦100" of the snap parameter (s), the probability (P80) associated with the movement amount "80" is set to be relatively high, and the probability (P0) associated with the movement amount "0" is also set to be relatively high.

The game control section 78 selects the movement amount of the player's piece 46 based on the strength parameter, the snap parameter, the movement amount table, and the probability data table (probability data). Further, the game control section 78 (combination selecting means) selects any one of the combinations (combinations of the states of the four "gold generals") corresponding to the selected movement amount. If there is one combination corresponding to the selected movement amount, the game control section 78 selects the combination. On the other hand, if there exist a plurality of combinations corresponding to the selected movement amount, the game control section 78 randomly selects any one of those combinations based on, for example, a random number. Then, the game control section 78 updates the game situation data based on the above-mentioned selected contents, and updates the game screen 40 based on the game situation data that has been updated. Details thereof are described later (see FIG. 15 and FIG. 17).

Figure 13:
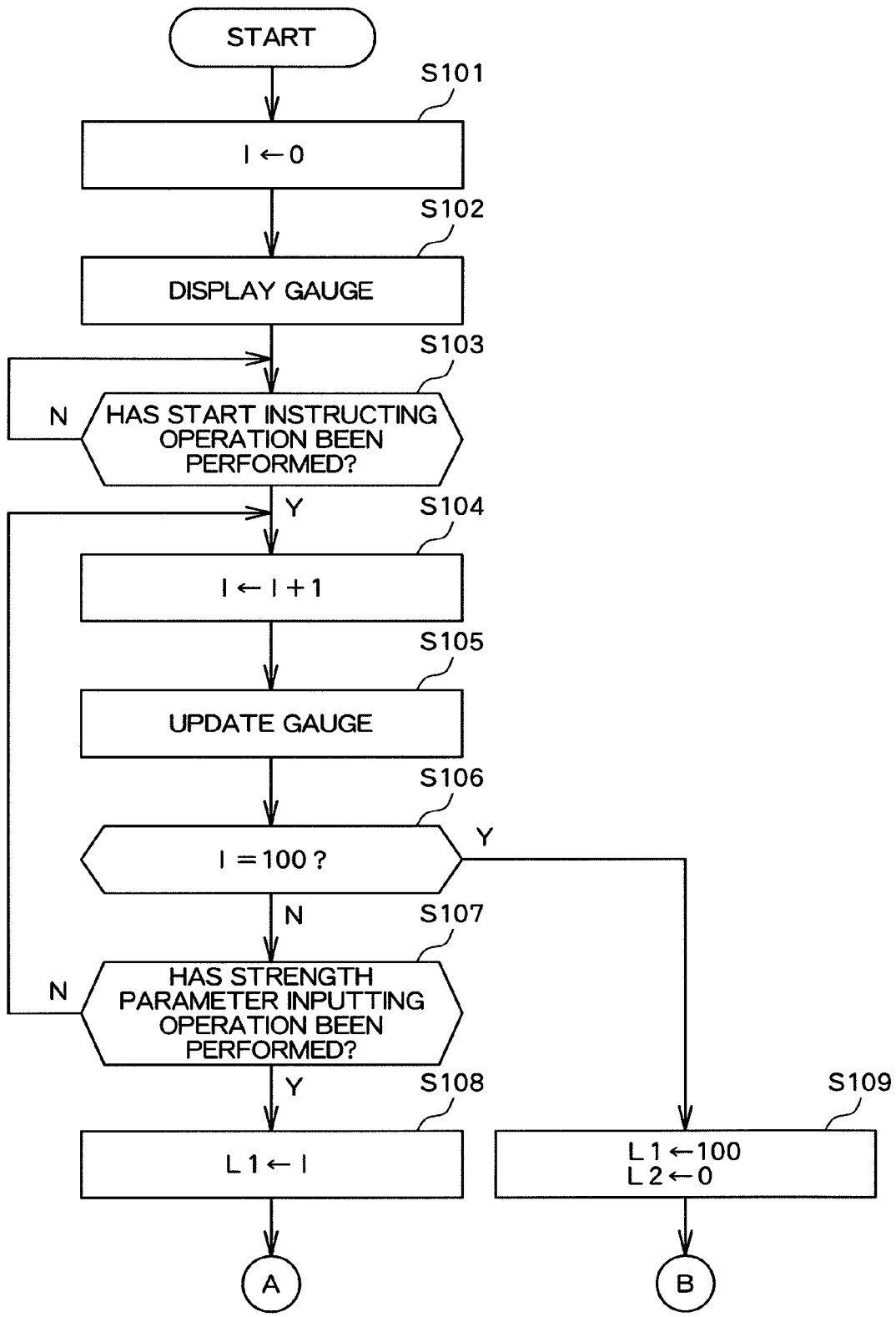
FIG. 13 A flowchart illustrating processing executed by the mobile phone.
Figure 14:
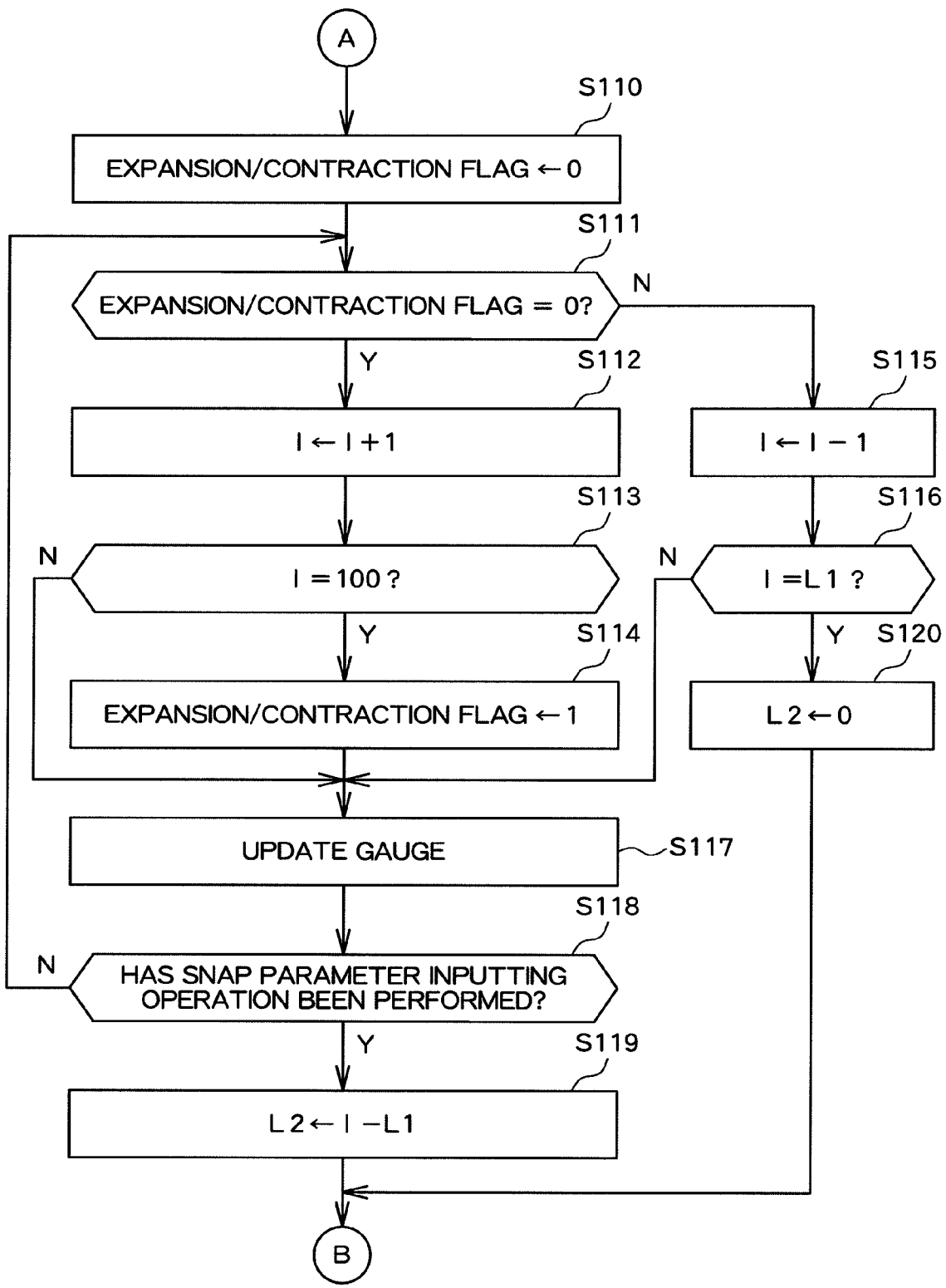
FIG. 14 A flowchart illustrating the processing executed by the mobile phone.
Figure 15:
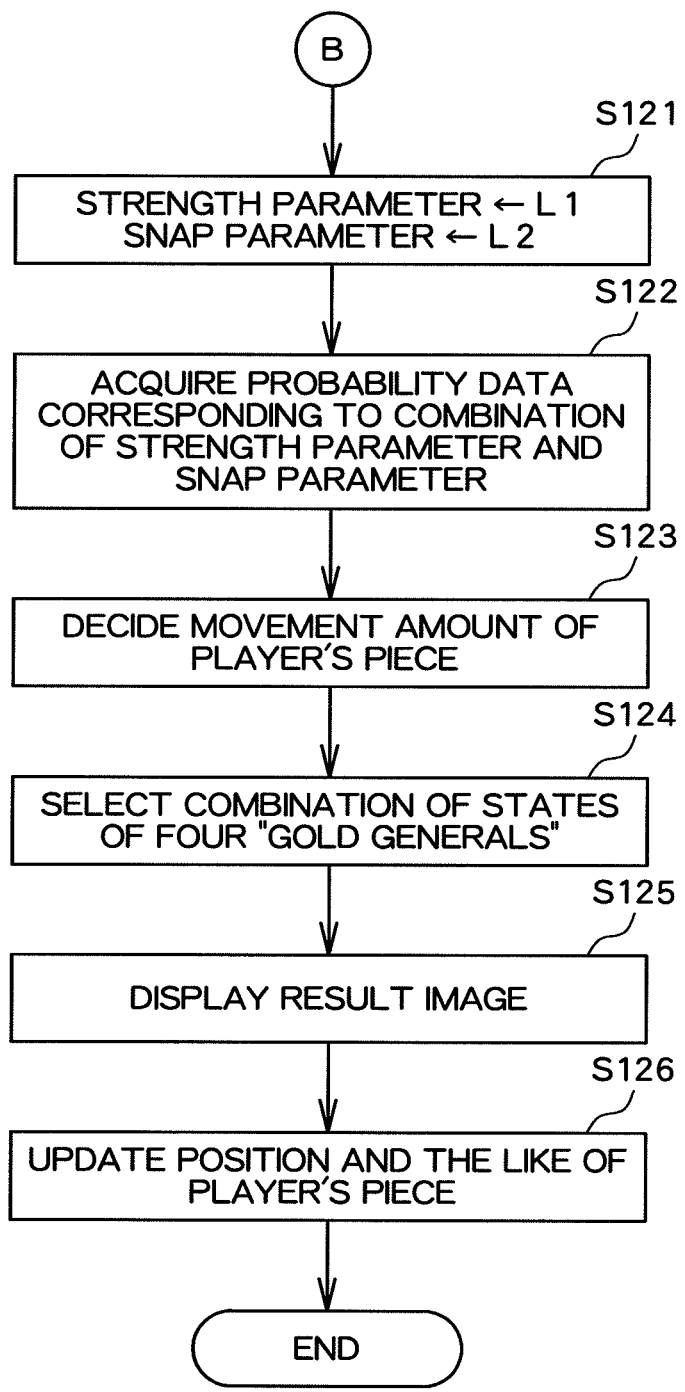
FIG. 15 A flowchart illustrating the processing executed by the mobile phone.

Next, description is given of processing executed by the mobile phone 10 for implementing the functional blocks illustrated in FIG. 9. FIG. 13 to FIG. 15 illustrate the processing executed when it is the player's turn to roll the "gold generals". The control section 24 executes the processing illustrated in FIG. 13 to FIG. 15 according to the program stored in the storage section 26.

As illustrated in FIG. 13, the control section 24 first initializes a variable l to 0 (S101). The variable l represents the length of the expandable image 64. Further, the control section (numerical value corresponding image display control section 74) displays the gauge 60 on the game screen 40 (S102). At this time, the length of the expandable image 64 is set to the value of the variable l. Therefore, at this time point, the length of the expandable image 64 is set to "0".

After that, the control section 24 monitors whether or not the start instructing operation has been performed (S103). If the start instructing operation has been performed, the control section (first numerical value changing section 72a) adds "1" to the variable l (S104). In addition, the control section 24 (numerical value corresponding image display control section 74) updates the gauge 60 (S105). In other words, the length of the expandable image 64 is updated based on the value of the variable l, and the expandable image 64 expands. After that, the control section 24 judges whether or not the variable l is "100" (S106). The case where the variable l is not "100" indicates a case where the length of the expandable image 64 is not the maximum length. In this case, the control section 24 judges whether or not the strength parameter inputting operation has been performed (S107). If the strength parameter inputting operation has not been performed, the control section 24 again executes the processing of Steps S104 to S107. Until the strength parameter inputting operation is performed or until the variable l reaches "100", the processing of Steps S104 to S107 is repeatedly executed every predetermined time (for example, 1/60$^{th}$ of a second). The processing of Steps S104 to S107 is repeatedly executed to thereby cause the expandable image 64 gradually expanding with the elapsed time to be displayed on the game screen 40.

If the strength parameter inputting operation has been performed, the control section 24 (first input value acquiring section 76a) sets the current value of the variable l to a variable L1 (S108). The variable L1 retains the value of the variable l obtained at the time point when the strength parameter inputting operation was performed.

After that, as illustrated in FIG. 14, the control section 24 initializes an expansion/contraction flag to "0" (S110). The expansion/contraction flag represents a numerical value indicating an expansion/contraction state of the expandable image 64, and takes the value of "0" or "1". The value "0" corresponds to a state in which the expandable image 64 is expanding (in other words, a state before the expandable image 64 reaches the maximum length), and the value "1" corresponds to a state in which the expandable image 64 is contracting (in other words, a state after the expandable image 64 reaches the maximum length).

The control section 24 judges whether or not the expansion/contraction flag is (S111). If the expansion/contraction flag is "0" (in other words, if the expandable image 64 is expanding), the control section 24 (second numerical value changing section 72b) adds "1" to the variable l (S112). Then, the control section 24 judges whether or not the variable l is "100" (S113). The case where the variable l is "100" indicates a case where the length of the expandable image 64 is the maximum length. In this case, the control section 24 updates the expansion/contraction flag to "1" (S114). On the other hand, if the variable l is not "100", the expansion/contraction flag remains "0". After that, the control section 24 (numerical value corresponding image display control section 74) updates the gauge 60 (S117). In other words, the length of the expandable image 64 is updated based on the value of the variable l, and the expandable image 64 expands.

On the other hand, if it is judged in Step S111 that the expansion/contraction flag is not "0" (in other words, the expansion/contraction flag is "1"), the control section 24 (second numerical value changing section 72*b*) subtracts "1" from the variable l (S115). Then, the control section 24 judges whether or not the variable l is equal to the variable L1 (S116). If the variable l is not equal to the variable L1, the control section 24 (numerical value corresponding image display control section 74) updates the gauge 60 (S117). In other words, the length of the expandable image 64 is updated based on the value of the variable l, and the expandable image 64 contracts.

After the update of the gauge 60 is performed, the control section 24 judges whether or not the snap parameter inputting operation has been performed (S118). If the snap parameter inputting operation has not been performed, the control section 24 again executes the processing of Steps S111 to S118. Until the snap parameter inputting operation is performed or until the variable l reaches the variable L1, the processing of Steps S111 to S118 is repeatedly executed every predetermined time (for example, $1/60^{th}$ of a second). As a result, unless the snap parameter inputting operation is performed before the length of the expandable image 64 reaches the maximum length (the variable l becomes "100"), the expandable image 64 keeps expanding (see Steps S111 to S114 and S117). Further, after the length of the expandable image 64 reaches the maximum length, until the snap parameter inputting operation is performed or until the length of the expandable image 64 becomes the length obtained at the time of the strength parameter inputting operation (the variable l becomes the variable L1), the expandable image 64 keeps contracting (see Steps S111 and S115 to S117).

If the snap parameter inputting operation has been performed, the control section 24 (second input value acquiring section 76*b*) sets a numerical value obtained by subtracting the value of variable L1 from the current value of the variable l, as a variable L2 (S119). The variable L2 retains a difference between the value of the variable l obtained at the time point when the snap parameter inputting operation was performed and the value of the variable of L1 (in other words, value of the variable l obtained at the time point when the strength parameter inputting operation was performed).

After that, as illustrated in FIG. 15, the control section 24 sets the value of the variable L1 as the value of the strength parameter, and sets the value of the variable L2 as the value of the snap parameter (S121).

Incidentally, the case where the variable l is judged to be "100" in Step S106 of FIG. 13 indicates a case where the strength parameter inputting operation has not been performed before the length of the expandable image 64 becomes the maximum length. In this case, the control section 24 sets the variable L1 to "100", and sets the variable L2 to "0" (S109). In other words, in this case, the strength parameter is set to "100", and the snap parameter is set to "0".

Further, the case where the variable l is equal to the variable L1 in Step S116 of FIG. 14 indicates a case where the snap parameter inputting operation has not been performed before the expandable image 64 returns to the length obtained at the time of the strength parameter inputting operation. In this case, the control section 24 sets the variable L2 to "0" (S120). In other words, in this case, the snap parameter is set to "0".

After the acquiring of the strength parameter and the snap parameter (S121) has been performed, the control section 24 (game control section 78) references the probability data table to read the probability data corresponding to the combination of the value of the strength parameter and the value of the snap parameter (S122). In other words, the probability data corresponding to the combination of the range including the value of the strength parameter and the range including the value of the snap parameter is read.

After that, the control section 24 (game control section 78: game progress information selecting means) decides the movement amount of the player's piece 46 based on the read probability data (S123). In other words, any one of the movement amounts retained in the probability data is selected based on the probability indicated by the probability data. In this step, for example, a random number generated within a predetermined numerical value range is used. The above-mentioned numerical value range is divided into partial ranges, the number of which is equal to the number of movement amounts retained in the probability data. Then, the partial ranges are associated with the respective movement amounts with no overlap. Assuming that the above-mentioned numerical value range has a width of "W" and that the probability associated with the movement amount is "P", the width of the partial range associated with the movement amount is set as "W*P". Therefore, if the probability associated with the movement amount is relatively low, the width of the partial range associated with the movement amount becomes small. On the other hand, if the probability associated with the movement amount is relatively high, the width of the partial range associated with the movement amount becomes large. Then, the movement amount associated with the partial range including the generated random number is selected as the movement amount of the player's piece 46. Note that in the probability data, information (probability information) indicating the above-mentioned partial range may be stored in place of the probability.

After that, the control section 24 (game control section 78: combination selecting means) decides the combination of the states of the four "gold generals" (S124). In other words, the control section 24 references the movement amount table to select any one of the combinations (combinations of the states of the four "gold generals") corresponding to the movement amount decided in Step S123. Note that if there are a plurality of combinations corresponding to the movement amount decided in Step S123, any one them is selected randomly based on the random number.

After that, the control section 24 (game control section 78) displays the result image 48 that represents the combination (combination of the states of the four "gold generals") selected in Step S124 on the game screen 40 (S125). In the storage section 26, result image data corresponding to the respective combinations of the states of the four "gold generals" is previously stored. The control section 24 reads the result image data corresponding to the combination selected in Step S124, and displays the result image 48 on the game screen 40 based on the result image data. Further, the control section 24 (game control section 78) updates the position and the like of the player's piece 46 based on the movement amount decided in Step S123 (S126). In other words, the game situation data is updated, and the game screen 40 is updated based on the game situation data that has been updated.

On the mobile phone 10 described above, the game of "mawari shogi" is executed. In the game, the player needs to input the strength parameter and the snap parameter when rolling the four "gold generals". With regard to the strength parameter and the snap parameter, such a restriction is imposed that the total value of those parameters must be equal to or smaller than "100". Therefore, for example, if the player sets the strength parameter to a relatively large value, the player will have to set the snap parameter to a relatively small value. This makes it necessary for the player to input the strength parameter and the snap parameter in consideration of the balance between those parameters. In this respect, the mobile phone 10 is configured so that the single gauge 60 (expandable image 64) is used to perform the inputting of the two parameters, in other words, the strength parameter and the snap parameter. The value of the strength parameter is acquired based on the numerical value corresponding to the length of the expansion portion (portion 64*a*) that expands until the time of the strength parameter inputting operation, and the value of the snap parameter is acquired based on the numerical value corresponding to the length of the difference portion (portion 64*b*) between the time of the strength parameter inputting operation and the time of the snap parameter inputting operation. Therefore, the player is allowed to smoothly input the strength parameter and the snap parameter in consideration of the balance between those parameters. In addition, on the mobile phone 10, there is no need to individually display the gauge for inputting the strength parameter and the gauge for inputting the snap parameter. In other words, there is no need to display a plurality of gauges on the game screen 40. According to the mobile phone 10, it becomes possible to avoid giving the player an impression that the screen is complicated.

First Modified Example of the First Embodiment

Note that hereinabove, the game control section 78 is configured to first decide the movement amount of the player's piece 46 and then decide the combination of the states of the four "gold generals" in accordance with the movement amount (see Steps S123 and S124 of FIG. 15). However, the game control section 78 may be configured to first decide the combination of the states of the four "gold generals" and then acquire the movement amount corresponding to the combination. Hereinafter, this aspect is described.

FIG. 16 illustrates an example of the probability data according to this aspect. The probability data illustrated in FIG. 16 is stored in place of the probability data illustrated in FIG. 12. The probability data illustrated in FIG. 16 is data obtained by associating the respective states of the "gold generals" with the probability information.

As described above, if the strength with which the "gold generals" are to be rolled is large, the probability that the "gold general" may fall off the shogi board 42 is higher. Therefore, the probability data table (FIG. 11) and the probability data (FIG. 16) are set so that the probability (P7) that the state of the "gold general" may become the seventh state becomes high if the strength parameter is large. For example, in the probability data associated with the range "90<p≦100" of the strength parameter (p), the probability (P7) associated with the seventh state is set to be high.

Further, as described above, if the strength with which the "gold generals" are to be rolled is small, the probability that the "gold generals" may overlap one another is higher. Therefore, the probability data table (FIG. 11) and the probability data (FIG. 16) are set so that the probability (P6) that the state of the "gold general" may become the sixth state becomes high if the strength parameter is small. For example, in the probability data associated with the range "0≦p≦10" of the strength parameter (p), the probability (P6) associated with the sixth state is set to be high.

Further, as described above, if an extent to which the snap is to be applied when the "gold generals" are rolled is large, the probability that the "gold general" may stand becomes high, and also the probability that the "gold generals" may overlap one another becomes high. Therefore, the probability data table (FIG. 11) and the probability data (FIG. 16) are set so that the probability (P3, P4, P5, P6) that the state of the "gold general" may become the third to sixth states becomes relatively high if the value of the snap parameter is large. For example, in the probability data associated with the range "90<s≦100" of the snap parameter (s), the probability (P3, P4, P5, P6) associated with the third to sixth states is set to be relatively high.

FIG. 17 is a flowchart illustrating a processing according to this aspect. The processing illustrated in FIG. 17 is executed in place of the processing illustrated in FIG. 15. Note that in FIG. 17, the same processing (step) as in FIG. 15 is denoted by the same reference symbol. Description thereof is omitted.

As illustrated in FIG. 17, after the acquiring of the strength parameter and the snap parameter (S121) has been performed, the control section 24 (game control section 78) references the probability data table (FIG. 11) to read the probability data (FIG. 16) corresponding to the combination of the value of the strength parameter and the value of the snap parameter (S122).

After that, the control section 24 (game control section 78) decides the combination of the states of the four "gold generals" based on the read probability data (S123*a*). First, the control section 24 (state selecting means) selects any one of the first to seventh states as the state of the first "gold general" based on the probability indicated by the probability data. Also, the control section 24 (state selecting means) selects any one of the first to seventh states as the state of the second "gold general" based on the probability indicated by the probability data. Further, the control section 24 (state selecting means) selects any one of the first to seventh states as the state of the third "gold general" based on the probability indicated by the probability data. Finally, the control section 24 (state selecting means) selects any one of the first to seventh states as the state of the fourth "gold general" based on the probability indicated by the probability data. The combination of the states of the four "gold generals" are thus decided. Incidentally, for example, in the case where the "gold generals" overlap one another, at least one "gold general" should lie over another "gold general", and another "gold general" should lie over at least one "gold general". In other words, in the case where the "gold generals" overlap one another, the states of at least two "gold generals" should become the sixth state. Therefore, the combination with only one "gold general" being the sixth state is a combination that may not actually happen. Such a combination (combination that may not actually happen) is previously stored in the storage section 26. Then, in this step (S123*a*), it is judged whether or not the combination of the states of the four "gold generals" is the combination that may not actually happen. If the combination of the states of the four "gold generals" is the combination that may not actually happen, the combination of the states of the four "gold generals" is decided again.

After the combination of the states of the four "gold generals" is decided, the control section 24 (game control section 78) acquires the movement amount of the player's piece 46 (S124*a*). The control section 24 (game control section 78)

references the movement amount table to acquire the movement amount corresponding to the combination of the states of the four "gold generals".

After that, the control section 24 (game control section 78) displays the result image 48 that indicates the combination (combination of the states of the four "gold generals") decided in Step S123a on the game screen 40 (S125). In other words, the control section 24 reads the result image data corresponding to the combination selected in Step S123a, and displays the result image 48 on the game screen 40 based on the result image data. Further, the control section 24 (game control section 78) updates the position and the like of the player's piece 46 of the player based on the movement amount acquired in Step S124a (S126). In other words, the game situation data is updated, and the game screen 40 is updated based on the game situation data that has been updated.

Second Modified Example of the First Embodiment

Note that the probability data illustrated in FIG. 18 may be stored in place of the probability data illustrated in FIG. 16. The probability data illustrated in FIG. 18 is data obtained by associating the combination of the states of the four "gold generals" with the probability information. In this case, in Step S123a of FIG. 17, the control section 24 (game control section 78: combination selecting means) selects any one of the combinations of the states of the four "gold generals" based on the probability indicated by the probability data.

Comparison Among a Basic Mode of the First Embodiment, the First Modified Example, and the Second Modified Example Here, description is given of effects of a basic mode of the first embodiment (aspect for storing the probability data illustrated in FIG. 12), the first modified example (aspect for storing the probability data illustrated in FIG. 16), and the second modified example (aspect for storing the probability data illustrated in FIG. 18).

First description is given of the effect of the first modified example (aspect for storing the probability data illustrated in FIG. 16). In "mawari shogi", it is relatively difficult to bring the "gold general" to a standing state (third to fifth states). Therefore, some players find pleasure in achieving the standing state of the "gold general" per se. For example, in the case where one of the four "gold generals" is brought to a standing state with the remaining three overlapping one another, the movement amount of the player's piece 46 becomes "0", but there is a case where the player may find pleasure in achieving getting the one "gold general" in a standing state per se. In this respect, if the frequency that the "gold general" is brought to a standing state becomes too low, the player becomes unable to find pleasure. In contrast, if the frequency that the "gold general" is brought to a standing state becomes too high, it becomes less rare that the "gold general" is brought to a standing state, and hence the player becomes unable to find pleasure in achieving the "gold general" being brought to a standing state. Therefore, the probability that the "gold general" is brought to a standing state needs to be adjusted so as to prevent the occurrence of inconvenience as described above. In the basic mode (aspect for storing the probability data illustrated in FIG. 12), the probability information is set for one or a plurality of combinations (combinations of the states of the four "gold generals") corresponding to the respective movement amounts, and hence it may become difficult to adjust the probability. Similarly in the second modified example (aspect for storing the probability data illustrated in FIG. 18), the probability information is set for the combination of the states of the four "gold generals", and hence it may become difficult to adjust the probability. In contrast, in the first modified example, the probability information is set for the respective states of the four "gold generals" (see FIG. 16), it becomes relatively easy to adjust the probability. As a result, it becomes possible to allow the player to find pleasure in achieving bringing the "gold general" to a standing state.

Next description is given of the effect of the second modified example (aspect for storing the probability data illustrated in FIG. 18). As described above, in the second modified example, the processing of FIG. 13, FIG. 14, and FIG. 17 is executed, and in Step S123a of FIG. 17, one of the combinations of the states of the four "gold generals" is selected based on the probability indicated by the probability data. According to the second modified example, there is no need to decide the state (first state to seventh state) for each of the four "gold generals". Therefore, it is possible to reduce the processing amount in comparison with the aspect (aspect for storing the probability data illustrated in FIG. 16; first modified example) for acquiring the movement amount corresponding to the combination of the states after deciding the state (first state to seventh state) for each of the four "gold generals". In other words, it becomes possible to achieve reduction in the processing load. Further, in the aspect (aspect for storing the probability data illustrated in FIG. 16; first modified example) for acquiring the movement amount corresponding to the combination of the states after deciding the state (first state to seventh state) for each of the four "gold generals", processing is needed for confirming/correcting the combination of the states of the four "gold generals" so as not to be the combination that may not actually happen. In contrast, in the second modified example (aspect for storing the probability data illustrated in FIG. 18), there is no need to perform such a processing because it suffices that the combination that may not actually happen is not set in the probability data. Also in this respect, it becomes possible to achieve reduction in the processing load.

Finally description is given of the effect of the basic mode (aspect for storing the probability data illustrated in FIG. 12). In other words, the description is given of the effect of the aspect for executing the processings of FIG. 13 to FIG. 15. In the basic mode, the combination of the states of the four "gold generals" is stored in association with the movement amount of the piece 46 (see FIG. 10). Then, after the movement amount of the player's piece 46 is first decided, any one of the combinations (combinations of the states of the four "gold generals") stored in association with the movement amount is selected (see Steps S123 and S124 of FIG. 15). Also in the basic mode, there is no need to decide the state (first state to seventh state) for each of the four "gold generals". Therefore, it is possible to reduce the processing amount in comparison with the aspect (aspect for storing the probability data illustrated in FIG. 16; first modified example) for acquiring the movement amount corresponding to the combination of the states after deciding the state (first state to seventh state) for each of the four "gold generals". In other words, it becomes possible to achieve reduction in the processing load. Further, also in the basic mode (aspect for storing the probability data illustrated in FIG. 12), there is no need to perform the processing for confirming/correcting the combination of the states of the four "gold generals" so as not to be the combination that may not actually happen if the combination that may not actually happen is prevented from being set in the movement amount table. In other words, also in this respect, it becomes possible to achieve reduction in the processing load. Further, the number of types of movement amount of the piece 46 is smaller than the number of types of combination of the states of the four "gold generals", and hence according to the basic mode, it is possible to reduce a data size of the probability data in comparison with the second modified example (aspect for storing the probability data illustrated in FIG. 18). In other words, it becomes possible to achieve reduction in the data amount.

Third Modified Example of the First Embodiment

Figures 19, 20:
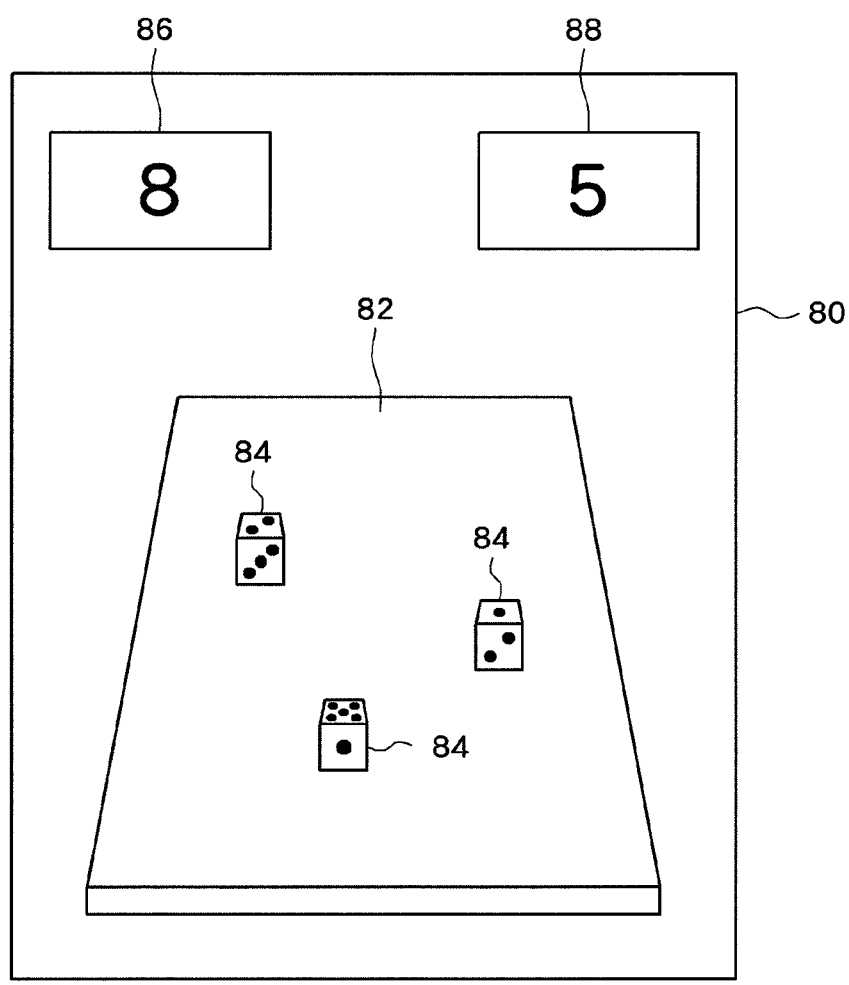
FIG. 19 A diagram illustrating an example of the probability data table.
FIG. 20 A diagram illustrating an example of the game screen.

For example, the probability data table is not limited to the aspect illustrated in FIG. 11. FIG. 19 illustrates another example of the probability data table. The probability data table illustrated in FIG. 19 is a table obtained by associating the combination of the condition related to the value of the strength parameter and the condition related to a ratio between the strength parameter and the snap parameter with the probability data (FIG. 12, FIG. 16, or FIG. 18). Note that in FIG. 19, the ratio (r) between the strength parameter and the snap parameter is obtained by dividing the strength parameter by the snap parameter. In this case, in Step S122 of FIG. 15 of FIG. 17, the ratio between the strength parameter and the snap parameter is first calculated. After that, the probability data table (FIG. 19) is referenced, and the probability data (FIG. 12, FIG. 16, or FIG. 18) corresponding to the combination of the range including the value of the strength parameter and the range including the calculated ratio is read. Note that the probability data table may be a table obtained by associating the combination of the condition related to the value of the snap parameter and the condition related to the ratio between the strength parameter and the snap parameter with the probability data (FIG. 12, FIG. 16, or FIG. 18).

Fourth Modified example of the First Embodiment

Further, for example, the combination of the states of the four "gold generals" and the movement amount of the player's piece 46 may be decided based on three or more types of parameters. In other words, the player may input three or more types of parameters. For example, in a case where the player inputs a first parameter (strength parameter), a second parameter (snap parameter), and a third parameter, after a second parameter inputting operation (snap parameter inputting operation) has been performed, the expandable image 64 may be changed between the length obtained at the time of the second parameter inputting operation (snap parameter inputting operation) and the maximum length. In other words, the variable l stored in the main memory may be changed between the value obtained at the time of the second parameter inputting operation (snap parameter inputting operation) and "100". Then, if a third parameter inputting operation has been performed, the third parameter (third input value) may be acquired based on a difference between the value obtained at that time point and the value obtained at the time of the second parameter inputting operation (snap parameter inputting operation). Accordingly, the present invention can also be applied to such a case where the player inputs three or more types of parameters (numerical values) in consideration of the balance thereamong.

Fifth Modified Example of the First Embodiment

Further, for example, after the strength parameter inputting operation has been performed, if the length of the expandable image 64 has returned to the length obtained at the time of the strength parameter inputting operation, the expandable image 64 may start expanding again. In this case, as processing performed when it is judged in Step S116 of FIG. 14 that the variable l is equal to the value of the variable L1, such processing as described below is executed in place of the processing of Step S120. In other words, after the expansion/contraction flag is updated to "0", the processing of Step S117 is executed, and the gauge 60 is updated. This causes the length of the expandable image 64 to keep changing between the length obtained at the time of the strength parameter inputting operation and the maximum length. As a result, the player becomes able to input the value of the snap parameter without being rushed.

Second Embodiment

The mobile phone 10 according to a second embodiment has the same external appearance and the same hardware configuration as that according to the first embodiment (FIG. 1 and FIG. 2). In addition, the functional blocks of the mobile phone 10 according to the second embodiment are similar to those according to the first embodiment (FIG. 9). Instead of the "mawari shogi" game, the mobile phone 10 according to the second embodiment executes a game configured such that a player and a virtual player (computer) respectively roll three dice to compete regarding a total value of pips on the three dice.

FIG. 20 illustrates an example of the game screen of the game executed by the mobile phone 10 according to the second embodiment. On a game screen 80 illustrated in FIG. 20, a stage 82, three dice 84, a first score field 86, and a second score field 88 are displayed. In this game, first, the virtual player rolls the three dice 84, and the total value of the pips on the three dice 84 is set as the score of the virtual player. The score of the virtual player is displayed in the second score field 88. Subsequently, the player rolls the three dice 84, and the total value of the pips on the three dice 84 is set as the score of the player. The score of the player is displayed in the first score field 86. Then, of the player and the virtual player, the one whose score is higher wins. Note that if one of the three dice 84 falls off the stage 82, the pips on the die 84 are regarded as "0". In addition, if at least two dice 84 are in proximity to each other, the pips on the dice 84 are similarly regarded as "0". Therefore, the player needs to roll the three dice 84 while paying attention so that none of the dice 84 fall off the stage 82 and so that the dice 84 are not brought into proximity with each other.

Here, description is given of an operation performed to roll the three dice 84. To roll the three dice 84, the player inputs a strength parameter and a snap parameter. The strength parameter and the snap parameter are similar to the strength parameter and the snap parameter used in the game of "mawari shogi".

The strength parameter is a parameter indicating a strength with which the dice 84 are to be rolled, and takes a value ranging from "0" to "100". As the strength parameter becomes larger, the dice 84 are to be rolled with larger strength. Note that in this game, as the strength with which the dice 84 are to be rolled becomes larger, the possibility that the pips on the die 84 may count a large number (5 or 6) becomes higher. In other words, there is a higher possibility that a high score may be produced. On the other hand, as the strength with which the dice 84 are to be rolled becomes larger, the possibility that the die 84 may fall off the stage 82 becomes higher. In other words, there is a higher possibility that the score may become "0". If the strength with which the dice 84 are to be rolled is made to be small, the possibility that the die 84 may fall off the stage 82 becomes lower, but the possibility that the pips on the die 84 may count a large number (5 or 6) becomes lower as well.

The snap parameter is a parameter indicating how much snap (strength in the wrist) is to be applied when the dice 84 are rolled, and takes a value ranging from "0" to "100". As the snap parameter becomes larger, the snap is to be applied more greatly when the dice 84 are rolled. Note that in this game, as the snap is to be applied more greatly when the dice 84 are rolled, the possibility that the dice 84 may fall apart from each other becomes higher. In other words, as the snap is to be applied less greatly when the dice 84 are rolled, the possibility that the dice 84 may be brought into proximity to each other becomes higher, and the possibility that the score may become "0" becomes higher.

Note that in the same manner as with the game of "mawari shogi", such a restriction is imposed on this game that the total value of the strength parameter and the snap parameter must be equal to or smaller than "100". This makes it necessary for the player to input the strength parameter and the snap parameter in consideration of a balance between the strength parameter and the snap parameter.

In the same manner as with the game of "mawari shogi", at a time when the player is ready to roll the three dice 84, a single gauge 60 (FIG. 6 and FIG. 7) for inputting the strength parameter and the snap parameter is displayed in the center of the game screen 80.

Then, when the player performs the start instructing operation (in this embodiment, depression of the enter key 16*b*), the expandable image 64 expands in the rightward direction at a constant velocity. Once the expandable image 64 starts to expand, the player can input the strength parameter by performing the strength parameter inputting operation (in this embodiment, depression of the enter key 16*b*). The value of the strength parameter is set as the length of the expandable image 64 at the time of the strength parameter inputting operation.

Even after the strength parameter inputting operation has been performed, the expandable image 64 keeps expanding. If the expandable image 64 has expanded up to the right edge of the frame image 62, the expandable image 64 starts to contract. The length of the expandable image 64 is changed between the length at the time of the strength parameter inputting operation and the maximum length.

After the strength parameter inputting operation has been performed, the player can input the snap parameter by performing a snap parameter inputting operation (in this embodiment, depression of the enter key 16*b*) by a time when the length of the expandable image 64 returns to the length at the time of the strength parameter inputting operation. The value of the snap parameter is set as a difference between the length of the expandable image 64 at a time of the snap parameter inputting operation and the length of the expandable image 64 at the time of the strength parameter inputting operation. For example, as the difference in the length of the expandable image 64 between the time of the snap parameter inputting operation and the time of the strength parameter inputting operation becomes larger, the value of the snap parameter becomes larger.

For example, if the length of the expandable image 64 at the time of a strength parameter inputting operation is "70", and if the length of the expandable image 64 at the time of a snap parameter inputting operation is "90", the strength parameter is set to have a value of "70" and the snap parameter is set to have a value of "20" (=90−70). Note that the processing executed in order to receive inputs of the values of the strength parameter and the snap parameter is the same as that of Steps S101 to S121 of FIG. 13 to FIG. 15.

If the values of the strength parameter and the snap parameter have been acquired, the respective states of the three dice 84 and the score of the player are decided based on the values of those parameters. After that, the game screen 80 is updated based on the decided contents. For example, the states of the three dice 84 displayed on the game screen 80 are updated, and at the same time, the score corresponding to the states of the three dice 84 is displayed on the first score field 86.

Here, description is given of data for deciding the respective states of the three dice 84 and the score of the player based on the values of the strength parameter and the snap parameter.

In the second embodiment, a point table is stored. FIG. 21 illustrates an example of the point table. The point table illustrated in FIG. 21 is similar to the movement amount table (FIG. 10) of the first embodiment. The point table illustrated in FIG. 21 is a table obtained by associating a point value with a combination of the states of the three dice 84. Note that in a "combination of states of three dice" field of the point table illustrated in FIG. 21, the value "1" corresponds to a state in which a surface corresponding to "1" of the die 84 is facing up, and the pips on the die 84 count "1". Hereinafter, this state is referred to as a "first state". In the same manner, the value "2", "3", "4", "5", or "6" corresponds to a state in which a surface corresponding to "2", "3", "4", "5", or "6", respectively, of the die 84 is facing up, and the pips on the die 84 count "2", "3", "4", "5", or "6", respectively. Hereinafter, those states are referred to as "second to sixth states". In addition, the value "7" corresponds to a state in which the die 84 has fallen off the stage 82. Hereinafter, this state is referred to as a "seventh state". Further, the value "8" corresponds to a state in which the die 84 is in proximity to another die 84. Hereinafter, this state is referred to as an "eighth state". Note that in the point table illustrated in FIG. 21, for example, "(1,1,7)" indicates that the states of two dice 84 are the first state and that the state of the remaining one die 84 is the seventh state.

Also in the second embodiment, the probability data table is stored. The probability data table is the same as the probability data table (FIG. 11) of the first embodiment. In other words, the probability data table is data obtained by associating the combination of the condition related to the strength parameter and the condition related to the snap parameter with the probability data. FIG. 22 illustrates an example of the probability data stored in the probability data table of the second embodiment. As illustrated in FIG. 22, the probability data in the second embodiment is data obtained by associating the point value with the probability information.

Next description is given of processing for deciding the respective states of the three dice 84 and the score of the player based on the strength parameter and the snap parameter. FIG. 23 is a flowchart illustrating this processing. The processing illustrated in FIG. 23 is processing similar to Steps S122 to S126 of FIG. 15, and is executed in place of the processing of Steps S122 to S126 of FIG. 15.

In other words, first, the control section 24 references the probability data table to read the probability data corresponding to the combination of the values of the strength parameter and the snap parameter (S201). Then, the control section 24 decides the score of the player based on the read probability data (S202). In other words, any one of the point values retained in the probability data is selected as the score of the player based on the probability indicated by the probability data. After that, the control section 24 decides the combination of the states of the three dice 84 (S203). In other words, the control section 24 references the point table to select any one of the combinations (combinations of the states of the three dice 84) corresponding to the score decided in Step S202. Then, the control section 24 updates the game screen 80 based on the score of the player decided in Step S202 and the combination of the states of the three dice 84 decided in Step S203 (S204).

With the above-mentioned configuration, in the game configured such that the player and the virtual player (computer) respectively roll three dice to compete with respect to the total value of pips on the three dice, the player becomes able to smoothly input a plurality parameters (strength parameter and snap parameter) in consideration of the balance between those parameters. Further, it becomes unnecessary to display a plurality of gauges on the game screen 80, which makes it possible to avoid giving the player an impression that the screen is complicated.

First Modified Example of the Second Embodiment

A first modified example of the second embodiment is similar to the first modified example of the first embodiment. In the first modified example of the second embodiment, instead of deciding the combination of the states of the three dice 84 in accordance with the score of the player after the score is first decided, the combination of the states of the three dice 84 is first decided, and then the score corresponding to the combination is acquired.

FIG. 24 illustrates an example of the probability data according to the first modified example. The probability data illustrated in FIG. 24 is similar to the probability data (FIG. 16) according to the first modified example of the first embodiment. The probability data illustrated in FIG. 24 is data obtained by associating the respective states of the three dice 84 with the probability information, and is stored in place of the probability data illustrated in FIG. 22.

Also in the first modified example, the processing similar to the processing illustrated in FIG. 23 is executed. However, in the first modified example, in the processing illustrated in FIG. 23, the processing of Step S202 and the processing of Step S203 are interchanged in order. In other words, after the processing of Step S201 is executed, the processing of Step S203 is first executed, and then the processing of Step S202 is executed.

In the processing of Step S201, the probability data (FIG. 24) corresponding to the combination of the value of the strength parameter and the value of the snap parameter is read from the probability data table. Further, in the processing of Step S203, the combination of the states of the three dice 84 is decided. First, as the state of the first die 84, any one of the first to eighth states is selected based on the probability indicated by the probability data. Similarly, as the state of the second die 84, any one of the first to eighth states is selected based on the probability indicated by the probability data. In addition, as the state of the third die 84, any one of the first to eighth states is selected based on the probability indicated by the probability data. Then, in the processing of Step S202 executed after the processing of Step S203 is executed, the point table is referenced, the point value corresponding to the combination of the states of the three dice 84 is acquired, and the point value is decided as the score of the player.

Second Modified Example of the Second Embodiment

A second modified example of the second embodiment is similar to the second modified example of the first embodiment. In the second modified example of the second embodiment, the probability data illustrated in FIG. 25 is stored instead of the probability data illustrated in FIG. 24. The probability data illustrated in FIG. 25 is similar to the probability data (FIG. 18) according to the second modified example of the first embodiment. The probability data illustrated in FIG. 25 is data obtained by associating the combination of the states of the three dice 84 with the probability information.

Also in the second modified example, the processing similar to the processing illustrated in FIG. 23 is executed. However, also in the second modified example, in the processing illustrated in FIG. 23, the processing of Step S202 and the processing of Step S203 are interchanged in order. In other words, after the processing of Step S201 is executed, the processing of Step S203 is first executed, and then the processing of Step S202 is executed.

In the processing of Step S201, the probability data (FIG. 25) corresponding to the combination of the value of the strength parameter and the value of the snap parameter is read from the probability data table. In addition, in the processing of Step S203, any one of the combinations of the states of the three dice 84 is selected based on the probability indicated by the probability data. Then, in the processing of Step S202 executed after the processing of Step S203 is executed, the point table is referenced, the point value corresponding to the combination of the states of the three dice 84 is acquired, and the point value is decided as the score of the player.

Third Modified Example of the Second Embodiment

In the same manner as the third modified example (FIG. 19) of the first embodiment, the probability data table may be a table obtained by associating the combination of the condition related to the value of the strength parameter and the condition related to the ratio between the strength parameter and the snap parameter with the probability data (FIG. 22, FIG. 24, or FIG. 25). Then, in Step S201 of FIG. 23, the probability data corresponding to the combination of the value of the strength parameter and the ratio between the strength parameter and the snap parameter may be read from the probability data table.

Fourth Modified Example of the Second Embodiment

In the same manner as the fourth modified example of the first embodiment, the combination of the states of three dice 84 and the score of the player may be decided based on three or more types of parameter.

Fifth Modified Example of the Second Embodiment

In the same manner as the fifth modified example of the first embodiment, after the strength parameter inputting operation has been performed, if the length of the expandable image 64 has returned to the length obtained at the time of the strength parameter inputting operation, the expandable image 64 may be caused to start expanding again.

Other Embodiments

Note that the present invention is not limited to the first embodiment and the second embodiment described above.

For example, the game executed by the mobile phone 10 is not limited to the above-mentioned game of "mawari shogi" or the above-mentioned dice game. In other words, the present invention can be applied to a game other than the above-mentioned game of "mawari shogi" or the above-mentioned dice game.

The present invention can be applied to a game where the player needs to input a plurality of numerical values (parameters) in consideration of the balance of those numerical values. For example, the present invention can also be applied to a game ("Struck Out" game or darts game) configured such that the player aims at hitting any one of a plurality of targets with an object such as a ball or an arrow. In other words, the present invention can also be applied to a game configured such that the player inputs parameters indicating the strength and the snap with which an object such as a ball or an arrow is to be thrown and such that it is decided, based on those parameters (for example, based on a ratio between those parameters or the like), whether or not the ball or the arrow is to hit any one of the plurality of targets, or which targets the ball or the arrow is to hit.

For example, the present invention can also be applied to a game configured such that a player character throws a boomerang toward a target object (such as an apple) based on the values of the strength parameter and the snap parameter input by the player. In this game, as the strength parameter has a larger value, the boomerang flies farther. In addition, as the snap parameter has a larger value, the possibility that the boomerang may return to a hand becomes higher. The player adjusts the values of the strength parameter and the snap parameter so that the boomerang may return to the hand after hitting the target object. Also in such a game, by employing the gauge 60 illustrated in FIG. 6 and FIG. 7 as the interface for allowing the player to input the strength parameter and the snap parameter, it becomes possible to allow the user to smoothly input a plurality parameters (strength parameter and snap parameter) in consideration of the balance between those parameters. Further, it becomes unnecessary to display a plurality of gauges on the game screen, which makes it possible to avoid giving the player an impression that the screen is complicated.

The invention claimed is:

1. A game device comprising:
a storage section that stores a numerical value;
a display section that displays on a screen an image that is changed according to a change of the numerical value;
a first numerical value changing section that changes the numerical value between a first predetermined value and a second predetermined value;
a first input value acquiring section that acquires, if a first operation is performed, a first input value based on the numerical value obtained at a time corresponding to a time when the first operation is performed;
a second numerical value changing section that changes, after the first operation is performed, the numerical value between the numerical value obtained at the time corresponding to the time when the first operation is performed and the second predetermined value;
a second input value acquiring section that acquires, if a second operation is performed after the first operation has been performed, a second input value based on the numerical value obtained at the time corresponding to the time when the first operation is performed and the numerical value obtained at a time corresponding to a time when the second operation is performed; and
a game control section that controls a game based on the first input value and the second input value,
wherein the second input value is a value between the first input value and the second predetermined value.

2. The game device according to claim 1, wherein:
the first input value acquiring section acquires the first input value based on a difference between the first predetermined value and the numerical value obtained at the time corresponding to the time when the first operation is performed; and
the second input value acquiring section acquires the second input value based on a difference between the numerical value obtained at the time corresponding to the time when the first operation is performed and the numerical value obtained at the time corresponding to the time when the second operation is performed.

3. The game device according to claim 1, wherein the game control section controls the game based on a ratio between the first input value and the second input value.

4. The game device according to claim 1, wherein:
the game is a game that progresses based on a combination of respective states of a plurality of objects, which is decided according to an operation of a player;
the game control section reads stored content of a storage that stores one or more combinations of the respective states of the plurality of objects in association with each of a plurality of game progress control information items,
selects any one of the plurality of game progress control information items based on the first input value and the second input value,
selects any one of the one or more combinations stored in association with the selected game progress control information item,
displays on the screen the selected combination, and
controls a progress of the game based on the selected game progress control information item.

5. The game device according to claim 1, wherein:
the game is a game that progresses based on a combination of respective states of a plurality of objects, which is decided according to an operation of a player;
the game control section reads stored content of a storage that stores data obtained by associating the combination of the respective states of the plurality of objects with probability information, in association with a condition related to the first input value and the second input value,
reads stored content of a storage that stores
a game progress control information item in association with the combination of the respective states of the plurality of objects,
reads the data stored in association with the condition satisfied by the first input value and the second input value, selects the combination of the respective states of the plurality of objects with a probability based on the probability information associated with the combination of the respective states of the plurality of objects in the data,
displays on the screen the combination of the respective states of the plurality of objects selected by the combination selecting section, and
controls progress of the game based on the game progress control information item stored in association with the selected combination of the respective states of the plurality of objects.

6. The game device according to claim 1, wherein:
the game is a game that progresses based on a combination of respective states of a plurality of objects, which is decided according to an operation of a player;
the game control section reads stored content of a storage that stores data obtained by associating each of a plurality of states into which the object can be brought with probability information, in association with conditions related to the first input value and the second input value, reads stored content of a storage that stores a game progress control information item in association with the combination of the respective states of the plurality of objects, reads the data stored in association with the condition satisfied by the first input value and the second input value, selects the respective states of the plurality of objects from the plurality of states with a probability based on the probability information associated with the each of the plurality of states in the data, displays on the screen the selected combination of the respective states of the plurality of objects, and controls progress of the game based on the game progress control information item stored in association with the selected combination of the respective states of the plurality of objects.

7. A control method for a game device including at least one processor, the control method comprising:

displaying on a screen an image that is changed according to a change of a numerical value;

changing, the at least one processor, the numerical value between a first predetermined value and a second predetermined value;

acquiring, using the at least one processor if a first operation is performed, a first input value based on the numerical value obtained at a time corresponding to a time when the first operation is performed;

changing, using the at least one processor after the first operation is performed, the numerical value between the numerical value obtained at the time corresponding to the time when the first operation is performed and the second predetermined value;

acquiring, using the at least one processor if a second operation is performed after the first operation has been performed, a second input value based on the numerical value obtained at the time corresponding to the time when the first operation is performed and the numerical value obtained at a time corresponding to a time when the second operation is performed; and controlling, the at least one processor, a game based on the first input value and the second input value, wherein the second input value is a value between the first input value and the second predetermined value.

8. A non-transitory computer-readable information storage medium storing a program for causing a computer to function as a game device, the program further causing the computer to function as:

a numerical value storage section that stores a numerical value;

an image display control section that displays on a screen an image that is changed according to a change of the numerical value;

a first numerical value changing section that changes the numerical value between a first predetermined value and a second predetermined value;

a first input value acquiring section that acquires, if a first operation is performed, a first input value based on the numerical value obtained at a time corresponding to a time when the first operation is performed;

a second numerical value changing section that changes, after the first operation is performed, the numerical value between the numerical value obtained at the time corresponding to the time when the first operation is performed and the second predetermined value;

a second input value acquiring section that acquires, if a second operation is performed after the first operation has been performed, a second input value based on the numerical value obtained at the time corresponding to the time when the first operation is performed and the numerical value obtained at a time corresponding to a time when the second operation is performed; and a game control section that controls a game based on the first input value and the second input value, wherein the second input value is a value between the first input value and the second predetermined value.

9. A game device comprising:

a display section that displays on a screen a frame image of a gauge and an expandable image that is changed according to a change of a numerical value; and a control section that changes the numerical value between a start value and an end value, acquires, in response to a first operation of the game device, a first input value as the numerical value at the time of the first operation, changes, after the first operation is performed, the numerical value between the first input value and the end value, and acquires, in response to a second operation of the game device, a second input value as the numerical value at the time of the second operation, the second input value being between the first input value and the end value, and controls a game based on the first input value and the second input value.

10. The game device according to claim 9, wherein, after the first operation is performed, the control section changes the numerical value back and forth between the first input value and the end value.

11. The game device according to claim 9, wherein the first input value and the second input value correspond to a ratio of a first variable to a second variable, and the control section controls the game based on the first variable and the second variable.

12. The game device according to claim 9, wherein the first operation is a keypress and the second operation is a keypress.

13. The game device according to claim 9 comprising a storage that stores the numerical value.

14. A control method for a game device including at least one processor, the control method comprising:

displaying on a screen a frame image of a gauge and an expandable image that is changed according to a change of a numerical value;

changing, using the at least one processor, the numerical value between a start value and an end value;

acquiring, using the at least one processor and in response to a first operation of the game device, a first input value as the numerical value at the time of the first operation;

changing, using the at least one processor after the first operation is performed, the numerical value between the first input value and the end value;

acquiring, using the at least one processor and in response to a second operation of the game device, a second input value as the numerical value at the time of the second operation, the second input value being between the first input value and the end value; and controlling a game based on the first input value and the second input value.

15. A non-transitory computer-readable information storage medium storing a program for causing a computer to function as a game device, the program further causing the computer to function as:

a display section that displays on a screen a frame image of a gauge and an expandable image that is changed according to a change of a numerical value; and a control section that changes the numerical value between a start value and an end value, acquires, in response to a first operation of the game device, a first input value as the numerical value at the time of the first operation, changes, after the first operation is performed, the numerical value between the first input value and the end value, and acquires, in response to a second operation of the game device, a second input value as the numerical value at the time of the second operation, the second input value being between the first input value and the end value, and controls a game based on the first input value and the second input value.

* * * * *